(12) United States Patent
Johnson et al.

(10) Patent No.: US 12,736,457 B2
(45) Date of Patent: Sep. 15, 2026

(54) SYSTEM AND METHOD OF EVALUATING FLUIDIC SUBSTANCE

(71) Applicant: Beckman Coulter, Inc., Brea, CA (US)

(72) Inventors: Joanna Johnson, Chaska, MN (US); Taylor Gregory, Chaska, MN (US); Amit Sawhney, Chaska, MN (US); Takayuki Mizutani, Chaska, MN (US)

(73) Assignee: Beckman Coulter, Inc., Brea, CA (US)

( * ) Notice: Subject to any disclaimer, the term of this patent is extended or adjusted under 35 U.S.C. 154(b) by 274 days.

(21) Appl. No.: 18/613,413

(22) Filed: Mar. 22, 2024

(65) Prior Publication Data

US 2024/0404302 A1 Dec. 5, 2024

Related U.S. Application Data

(63) Continuation of application No. PCT/IB2022/058848, filed on Sep. 19, 2022.

(60) Provisional application No. 63/247,360, filed on Sep. 23, 2021.

(51) Int. Cl.

*G01N 15/06* (2024.01)
*G01N 15/075* (2024.01)
*G06T 7/00* (2017.01)
*G06V 10/25* (2022.01)
*G06V 20/69* (2022.01)

(52) U.S. Cl.

CPC ........... *G01N 15/06* (2013.01); *G01N 15/075* (2024.01); *G06T 7/0014* (2013.01); *G06V 10/25* (2022.01); *G06V 20/695* (2022.01); *G06T 2207/30004* (2013.01); *G06V 2201/03* (2022.01)

(58) Field of Classification Search

None

See application file for complete search history.

(56) References Cited

U.S. PATENT DOCUMENTS

2015/0330878 A1* 11/2015 Shiba ............... G01N 35/00712 422/65
2020/0057880 A1* 2/2020 Mizutani ................ G06V 20/50
2021/0223163 A1* 7/2021 Nugent .................. H04N 23/64

(Continued)

OTHER PUBLICATIONS

International Search Report, Written Opinion of related Intl Application PCT/IB2022/058848, Mar. 30, 2023, 17 pages.

*Primary Examiner* — Sj Park
*Assistant Examiner* — Caroline E. Depalma
(74) *Attorney, Agent, or Firm* — FBT Gibbons LLP

(57) ABSTRACT

The present disclosure provides a method (400) of evaluating a fluidic substance (10) having particles (11). The method (400) comprises capturing a reference image (202) of at least a portion of a container (102) that is in an empty state; determining a reference grayscale value (V1) of at least a portion of the reference image (202); aspirating a volume of the fluidic substance (10) into the container (102); capturing a test image (252) of the container (102) containing the aspirated volume of the fluidic substance (10); determining a test grayscale value (V2) of at least a portion of the test image (252); calibrating a universal calibration curve (56) relating particle concentration and grayscale value based on the reference and test grayscale values (V1, V2); and determining a particle concentration (P1) in the fluidic substance (10) based on the test grayscale value (V2) and the calibrated universal calibration curve (60).

14 Claims, 22 Drawing Sheets

(56) References Cited

U.S. PATENT DOCUMENTS

| | | | | |
|---|---|---|---|---|
| 2022/0065881 | A1* | 3/2022 | Kato | G01N 21/82 |
| 2023/0069577 | A1* | 3/2023 | Case | G06V 10/22 |

* cited by examiner

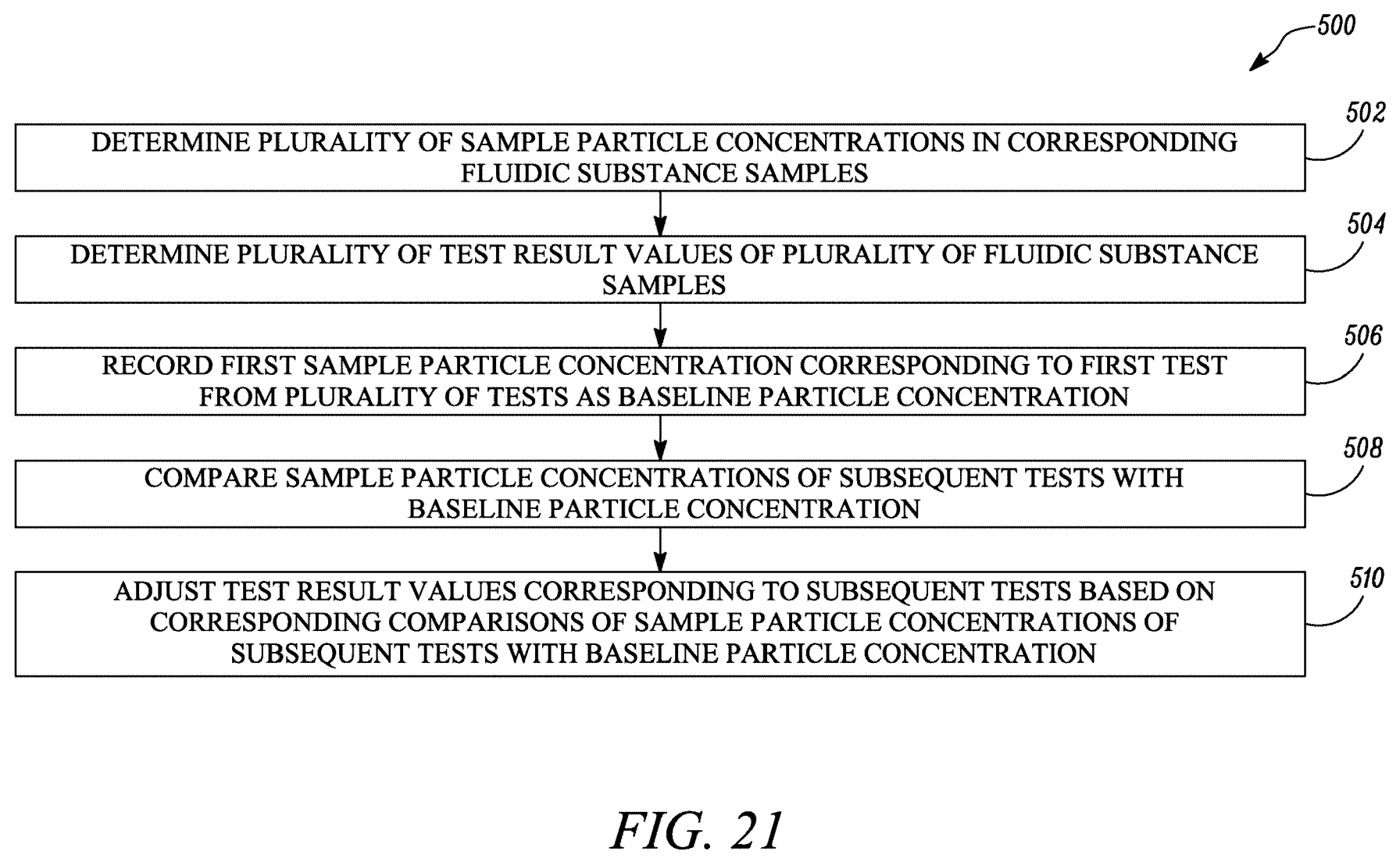

500

502 — DETERMINE PLURALITY OF SAMPLE PARTICLE CONCENTRATIONS IN CORRESPONDING FLUIDIC SUBSTANCE SAMPLES

504 — DETERMINE PLURALITY OF TEST RESULT VALUES OF PLURALITY OF FLUIDIC SUBSTANCE SAMPLES

506 — RECORD FIRST SAMPLE PARTICLE CONCENTRATION CORRESPONDING TO FIRST TEST FROM PLURALITY OF TESTS AS BASELINE PARTICLE CONCENTRATION

508 — COMPARE SAMPLE PARTICLE CONCENTRATIONS OF SUBSEQUENT TESTS WITH BASELINE PARTICLE CONCENTRATION

510 — ADJUST TEST RESULT VALUES CORRESPONDING TO SUBSEQUENT TESTS BASED ON CORRESPONDING COMPARISONS OF SAMPLE PARTICLE CONCENTRATIONS OF SUBSEQUENT TESTS WITH BASELINE PARTICLE CONCENTRATION

*FIG. 21*

SYSTEM AND METHOD OF EVALUATING FLUIDIC SUBSTANCE

CROSS REFERENCE TO RELATED APPLICATIONS

This application is a continuation of International Application No. PCT/IB2022/058848, filed Sep. 19, 2022, entitled "System and Method for Evaluating Fluidic Substances," the entire disclosure of which is hereby incorporated by reference in its entirety, and which claims priority to U.S. provisional patent application 63/247,360, filed on Sep. 23, 2021.

FIELD

The present disclosure relates to a field of fluidic substance evaluation. Particularly, the present disclosure relates to a system and a method of evaluating a fluidic substance having particles. Further, the present disclosure also relates to an automated analyzer for analyzing a fluidic substance.

BACKGROUND

Clinical analyzers and/or immunoassays are well known in the art and are generally used for automated or semi-automated analysis of patient samples, such as blood, urine, spinal fluid, and the like. For testing and analyzing the patient sample, several key components are dispensed into a reaction vessel. One of the key components is a reagent comprising test particles which are typically magnetic or paramagnetic particles. In general, prior to dispensing the components in the reaction vessel, the patient sample and the reagent are dispensed into a cuvette and mixed together to form particle carriers. Each of the particle carriers includes at least a test particle of the reagent and an analyte particle of the patient sample. The particle carriers are then dispensed into the reaction vessel for sample testing.

The test particles in the reagent have a tendency to settle down and aggregate at a bottom of a vessel over a period of time. For generating accurate test results of the sample testing by the analyzers, the test particles in the reagent should be properly dispersed in the reaction vessel. Conventional analyzers may generate false test results (i.e., false negatives or false positives) if the test particles in the reagent are not properly dispersed in the reaction vessel. Further, an analyst may not be able to determine if the test result of the patient sample is a correct test result or an incorrect test result. The incorrect test result may further lead to serious problems during the course of treatment of one or more patients.

One of the conventional techniques to disperse the test particles is to use ultrasonic resuspension. This can be done by using an ultrasonic resonator at an end of a reagent probe which is used to dispense the reagent into a cuvette or the reaction vessel. However, there may be no effective method to validate or diagnose whether the test particles are properly dispersed or not.

Further, in spite of the ultrasonic resuspension, the test particles may not be efficiently dispersed due to various faults that may occur during the process of sample testing. Some of the faults may include low voltage setting, power calibration error, probe tip erosion, probe height alignment error, etc. Conventional systems and methods typically do not determine any parameter related to the test particles. Further, conventional systems and methods may be unable to accurately determine the dispersion of the test particles in the reagent or any fluid due to instrument variability and error. Conventional systems and methods also do not account for any variations in test particle parameters when consecutive tests are conducted using a same analyzer.

BRIEF SUMMARY

According to a first aspect of the disclosure, a method of evaluating a fluidic substance having particles is provided. The method further comprises capturing, via an image capture device, a reference image of at least a portion of a container that is in an empty state. The method further comprises determining, via a processor, a reference grayscale value of at least a portion of the reference image. The method further comprises aspirating a volume of the fluidic substance into the container. The method further comprises capturing, via the image capture device, a test image of the container containing the aspirated volume of the fluidic substance. The method further comprises determining, via the processor, a test grayscale value of at least a portion of the test image. The method further comprises calibrating, via the processor, a universal calibration curve relating particle concentration and grayscale value based on the reference and test grayscale values. The method further comprises determining, via the processor, a particle concentration in the fluidic substance based on the test grayscale value and the calibrated universal calibration curve.

According to an embodiment of the method of the first aspect, the method further comprises determining, via the processor, one or more empty regions of interest in the reference image of the container. The reference grayscale value is an average grayscale value of the one or more empty regions of interest.

According to an embodiment of the method of the first aspect, calibrating the universal calibration curve further comprises utilizing the reference grayscale value and the test grayscale value to adjust an output of the universal calibration curve.

According to an embodiment of the method of the first aspect, the method further comprises determining, via the processor, one or more test regions of interest in the test image of the container. The test grayscale value is an average grayscale value of the one or more test regions of interest.

According to an embodiment of the method of the first aspect, determining the particle concentration further comprises converting the test grayscale value to the particle concentration by applying the calibrated universal calibration curve.

According to an embodiment of the method of the first aspect, the method further comprises providing a screen spaced apart from the image capture device, such that the container is positioned between the image capture device and the screen.

According to an embodiment of the method of the first aspect, the method further comprises conducting a plurality of trials to generate the universal calibration curve. Conducting each trial comprises capturing, via the image capture device, a baseline image of at least a portion of a trial container that is in an empty state. Conducting each trial further comprises determining, via the processor, a baseline grayscale value of at least a portion of the baseline image. Conducting each trial further comprises aspirating a volume of a trial fluidic substance comprising the particles into the trial container. Conducting each trial further comprises capturing, via the image capture device, a trial image of the trial container containing the aspirated volume of the trial fluidic substance. Conducting each trial further comprises determining, via the processor, a trial grayscale value of at least a portion of the trial image by using the baseline grayscale value as a reference. Conducting each trial further comprises determining, via a spectrophotometer, a trial particle concentration in the trial fluidic substance. Conducting each trial further comprises recording, via the processor, the trial particle concentration corresponding to the trial grayscale value.

According to an embodiment of the method of the first aspect, the method further comprises generating a plot between the trial grayscale values and the trial particle concentrations corresponding to the plurality of trials. The universal calibration curve is generated from the plot.

According to an embodiment of the method of the first aspect, conducting each trial further comprises forming the trial fluidic substance via mixing a diluent with a reagent comprising the particles.

According to an embodiment of the method of the first aspect, the method further comprises generating a flagging result based on the particle concentration in the fluidic substance. The flagging result is indicative of a quality of the fluidic substance.

According to an embodiment of the method of the first aspect, the flagging result comprises a pass or a fail.

According to an embodiment of the method of the first aspect, the flagging result comprises an error flag when a magnitude of a difference between an expected particle concentration and the particle concentration based on the test grayscale value and the calibrated universal calibration curve is greater than 20% of the expected particle concentration.

According to an embodiment of the method of the first aspect, the flagging result comprises an error flag when the magnitude of the difference between the expected particle concentration and the particle concentration based on the test grayscale value and the calibrated universal calibration curve is greater than 10% of the expected particle concentration.

According to an embodiment of the method of the first aspect, the flagging result comprises an error flag when a magnitude of a difference between the particle concentration and 0.01 mg/ml is greater than 10% of 0.01 mg/ml.

According to an embodiment of the method of the first aspect, the flagging result comprises an error flag when the particle concentration is greater than 0.0115 mg/ml.

According to an embodiment of the method of the first aspect, the flagging result comprises an error flag when the particle concentration is less than 0.0085 mg/ml.

According to a second aspect of the disclosure, a method of performing a plurality of tests via testing a plurality of fluidic substance samples is provided. The method comprises determining a plurality of sample particle concentrations in the corresponding fluidic substance samples using the method of the first aspect. The method further comprises determining a plurality of test result values of the plurality of fluidic substance samples. The method further comprises recording a first sample particle concentration corresponding to a first test from the plurality of tests as a baseline particle concentration. The method further comprises comparing the sample particle concentration of each of the subsequent tests with the baseline particle concentration. The method further comprises adjusting the test result values corresponding to the subsequent tests based on the corresponding comparisons of the sample particle concentrations of the subsequent tests with the baseline particle concentration.

According to an embodiment of the method of the second aspect, each fluidic substance sample comprises at least a mixture of a specimen sample, a diluent, and a reagent comprising the particles.

According to an embodiment of the method of the second aspect, conducting each test further comprises dispensing the specimen sample into a dilution vessel. Conducting each test further comprises dispensing, via a reagent pipettor, the reagent into the dilution vessel. Conducting each test further comprises dispensing, via the reagent pipettor, the diluent into the dilution vessel. Conducting each test further comprises mixing the specimen sample, the diluent, and the reagent in the dilution vessel to form the fluidic substance. The volume of the fluidic substance in the container is aspirated from the dilution vessel.

According to an embodiment of the method of the second aspect, each of the corresponding comparisons of the sample particle concentrations of the subsequent tests with the baseline particle concentration is indicative of a residual diluent present on the reagent pipettor from one or more previous tests.

According to an embodiment of the method of the second aspect, the test result values include relative light unit (RLU) values.

According to an embodiment of the method of the second aspect, determining the plurality of test result values further comprises optically analyzing, via a luminometer, the corresponding fluidic substance samples.

According to an embodiment of the method of the second aspect, the test result values corresponding to the subsequent tests are adjusted based on corresponding deviations between the sample particle concentrations of the subsequent tests and the baseline particle concentration.

According to an embodiment of the methods of the first and second aspects, the particles in the fluidic substance are paramagnetic particles or magnetic particles.

According to an embodiment of the methods of the first and second aspects, each of the methods is implemented in a diagnostic analyzer.

According to an embodiment of the methods of the first and second aspects, each of the methods is implemented in an immunoassay analyzer.

According to a third aspect of the disclosure, a system for evaluating a fluidic substance having particles is provided. The system comprises a container configured to contain an aspirated volume of the fluidic substance. The system further comprises an image capture device configured to capture a reference image of at least a portion of the container in an empty state and a test image of the container containing the aspirated volume of the fluidic substance. The system further comprises a processor communicably coupled to the image capture device. The processor is configured to determine a reference grayscale value of at least a portion of the reference image. The processor is further configured to determine a test grayscale value of at least a portion of the test image. The processor is further configured to calibrate a universal calibration curve relating particle concentration and grayscale value based on the reference and test grayscale values. The processor is further configured to determine a particle concentration in the fluidic substance based on the test grayscale value and the calibrated universal calibration curve.

According to an embodiment of the system of the third aspect, the processor is further configured to determine one or more empty regions of interest in the reference image of the container. The processor is further configured to determine the reference grayscale value as an average grayscale value of the one or more empty regions of interest.

According to an embodiment of the system of the third aspect, the processor is further configured to calibrate the universal calibration curve by utilizing the reference grayscale value and the test grayscale value to adjust an output of the universal calibration curve.

According to an embodiment of the system of the third aspect, the processor is further configured to determine one or more test regions of interest in the test image of the container. The processor is further configured to determine the test grayscale value as an average grayscale value of the one or more test regions of interest.

According to an embodiment of the system of the third aspect, the processor is further configured to convert the test grayscale value to the particle concentration by applying the calibrated universal calibration curve in order to determine the particle concentration.

According to an embodiment of the system of the third aspect, the system further comprises a screen spaced apart from the image capture device, such that the container is positioned between the image capture device and the screen.

According to an embodiment of the system of the third aspect, the system is further configured to conduct a plurality of trials to generate the universal calibration curve. For each trial, the system further comprises a trial container configured to contain an aspirated volume of a trial fluidic substance comprising particles. For each trial, the image capture device is further configured to capture a baseline image of at least a portion of the trial container in an empty state and a trial image of the trial container containing the aspirated volume of the trial fluidic substance. The processor is further configured to determine a baseline grayscale value of at least a portion of the baseline image. The processor is further configured to determine a trial grayscale value of at least a portion of the trial image by using the baseline grayscale value as a reference.

According to an embodiment of the system of the third aspect, the processor is further configured to, for each trial, determine a trial particle concentration in the trial fluidic substance based on signals received from a spectrophotometer. The processor is further configured to record the trial particle concentrations corresponding to the plurality of trials. The processor is further configured to generate a plot between the trial grayscale values and the trial particle concentrations corresponding to the plurality of trials. The processor is further configured to generate the universal calibration curve from the plot. According to an embodiment of the system of the third aspect, for each trial, the trial fluidic substance is formed via mixing a diluent with a reagent comprising the particles.

According to an embodiment of the system of the third aspect, the processor is further configured to generate a flagging result based on the particle concentration in the fluidic substance. The flagging result is indicative of a quality of the fluidic substance. According to an embodiment of the system of the third aspect, the flagging result comprises a pass or a fail.

According to an embodiment of the system of the third aspect, the flagging result comprises an error flag when a magnitude of a difference between an expected particle concentration and the particle concentration based on the test grayscale value and the calibrated universal calibration curve is greater than 20% of the expected particle concentration.

According to an embodiment of the system of the third aspect, the flagging result comprises an error flag when the magnitude of the difference between an expected particle concentration and the particle concentration based on the test grayscale value and the calibrated universal calibration curve is greater than 10% of the expected particle concentration. According to an embodiment of the system of the third aspect, the flagging result comprises an error flag when a magnitude of a difference between the particle concentration and 0.01 mg/ml is greater than 10% of 0.01 mg/ml. According to an embodiment of the system of the third aspect, the flagging result comprises an error flag when the particle concentration is greater than 0.0115 mg/ml. According to an embodiment of the system of the third aspect, the flagging result comprises an error flag when the particle concentration is less than 0.0085 mg/ml.

According to an embodiment of the system of the third aspect, the particles in the fluidic substance are paramagnetic particles or magnetic particles.

According to an embodiment, a diagnostic analyzer comprising the system of the third aspect is provided. According to an embodiment, an immunoassay analyzer comprising the system of the third aspect is provided.

According to a fourth aspect of the disclosure, a method for evaluating a fluidic substance having particles is provided. The method comprises capturing, via an image capture device, a reference image of at least a portion of a container that is in an empty state. The method further comprises determining, via a processor, a reference grayscale value of at least a portion of the reference image. The method further comprises aspirating a volume of the fluidic substance into the container. The method further comprises capturing, via the image capture device, a test image of the container containing the aspirated volume of the fluidic substance. The method further comprises determining, via the processor, a test grayscale value of at least a portion of the test image. The method further comprises calibrating, via the processor, a universal calibration curve relating particle concentration and grayscale value by utilizing the reference grayscale value and the test grayscale value to adjust an output of the universal calibration curve. The method further comprises determining, via the processor, a particle concentration in the fluidic substance based on the test grayscale value and the calibrated universal calibration curve.

According to a fifth aspect of the disclosure, an automated analyzer is provided. The automated analyzer comprises a container configured to dispense a specimen sample into a dilution vessel. The automated analyzer further comprises a reagent pipettor configured to dispense a reagent comprising particles into the dilution vessel and a reaction vessel. The reagent pipettor is further configured to dispense a diluent into the dilution vessel. The specimen sample, the reagent, and the diluent are mixed in the dilution vessel to form a fluidic substance. The container is further configured to aspirate a diagnostic volume of the fluidic substance from the dilution vessel and dispense the diagnostic volume into the reaction vessel. The automated analyzer further comprises a luminometer configured to perform optical analysis of the fluidic substance in the reaction vessel. The automated analyzer further comprises an image capture device configured to capture a reference image of at least a portion of the container in an empty state and a test image of the container containing the diagnostic volume of the fluidic substance. The automated analyzer further comprises a processor communicably coupled to the luminometer and the image capture device. The processor is configured to determine a test result value of the fluidic substance in the reaction vessel based on the optical analysis performed by the luminometer. The processor is further configured to determine a reference grayscale value of at least a portion of the reference image. The processor is further configured to determine a test grayscale value of at least a portion of the test image. The processor is further configured to calibrate a universal calibration curve relating particle concentration and grayscale value based on the reference and test grayscale values. The processor is further configured to determine a particle concentration in the fluidic substance based on the test grayscale value and the calibrated universal calibration curve. The processor is further configured to determine a quality of the fluidic substance based on the particle concentration in the fluidic substance.

According to an embodiment of the automated analyzer of the fifth aspect, the quality of the fluidic substance is indicative of a dispersion of the particles in the fluidic substance.

According to an embodiment of the automated analyzer of the fifth aspect, the processor is further configured to generate a flagging result based on the particle concentration in the fluidic substance. The flagging result is indicative of the quality of the fluidic substance.

According to an embodiment of the automated analyzer of the fifth aspect, the flagging result comprises a pass or a fail.

According to an embodiment of the automated analyzer of the fifth aspect, the flagging result comprises an error flag when a magnitude of a difference between an expected particle concentration and the particle concentration based on the test grayscale value and the calibrated universal calibration curve is greater than 20% of the expected particle concentration.

According to an embodiment of the automated analyzer of the fifth aspect, the flagging result comprises an error flag when a magnitude of a difference between an expected particle concentration and the particle concentration based on the test grayscale value and the calibrated universal calibration curve is greater than 10% of the expected particle concentration.

According to an embodiment of the automated analyzer of the fifth aspect, the flagging result comprises an error flag when a magnitude of a difference between the particle concentration and 0.01 mg/ml is greater than 10% of 0.01 mg/ml. According to an embodiment of the automated analyzer of the fifth aspect, the flagging result comprises an error flag when the particle concentration is greater than 0.0115 mg/ml.

According to an embodiment of the automated analyzer of the fifth aspect, the flagging result comprises an error flag when the particle concentration is less than 0.0085 mg/ml.

According to a sixth aspect of the disclosure, a system for performing a plurality of tests via testing a plurality of fluidic substance samples is provided. Each of the fluidic substance samples comprises particles. The system comprises a container configured to successively contain an aspirated volume of each of plurality of fluidic substance samples. The system further comprises an image capture device configured to capture a plurality of test images of the container containing the aspirated volumes of the corresponding plurality of fluidic substance samples. The system further comprises a processor communicably coupled to the image capture device. The processor is configured to determine a plurality of sample particle concentrations in the corresponding plurality of fluidic substance samples based at least on the corresponding plurality of test images. The processor is further configured to determine a plurality of test result values of the corresponding plurality of fluidic substance samples. The processor is further configured to record a first sample particle concentration corresponding to a first test from the plurality of tests as a baseline particle concentration. The processor is further configured to compare the sample particle concentration of each of the subsequent tests with the baseline particle concentration. The processor is further configured to adjust the test result values corresponding to the subsequent tests based on the corresponding comparisons of the sample particle concentrations of the subsequent tests with the baseline particle concentration.

According to an embodiment of the system of the sixth aspect, each of the plurality of fluidic substance samples comprises at least a mixture of a specimen sample, a diluent, and a reagent comprising the particles.

According to an embodiment of the system of the sixth aspect, the system further comprises a reagent pipettor. During each test, the reagent pipettor is configured to dispense the reagent into a dilution vessel and dispense the diluent into the dilution vessel. Each of the corresponding comparisons of the sample particle concentrations of the subsequent tests with the baseline particle concentration is indicative of a residual diluent present on the reagent pipettor from one or more previous tests.

According to an embodiment of the system of the sixth aspect, the test result values include relative light unit (RLU) values.

According to an embodiment of the system of the sixth aspect, the system further comprises a luminometer communicably coupled to the processor. The luminometer is configured to generate signals indicative of the test result values by optical analysis of the corresponding fluidic substance samples. According to an embodiment of the system of the sixth aspect, the processor is further configured to adjust the test result values corresponding to the subsequent tests based on corresponding deviations between the sample particle concentrations of the subsequent tests and the baseline particle concentration.

By determining the concentration of the particles in the fluidic substance based on the test grayscale value and the calibrated universal calibration curve, the system and the method of the present disclosure may check the dispersion of the particles in the fluidic substance. The particle concentration outside a given tolerance range may indicate that the particles are not properly dispersed in the fluidic substance. In such a case, the fluidic substance cannot be used in an assay or analyzer. Further, in case of an improper dispersion of the particles in the fluidic substance, the system and the method may generate an error result indicating that the fluidic substance should not be used in an assay or an analyzer. Improper dispersion of the particles in the fluidic substance may also indicate that there is a fault in a laboratory instrument, or a hardware component associated with the system. Further, various actions can be taken to timely rectify the fault, that may further result in a relatively lower laboratory downtime. Further, the system of the present disclosure may be integrated in the automated analyzer to diagnose the fluidic substance (i.e., a reagent) while conducting routine testing of the patient samples. In this way, the clinical analyzer can conduct routine analyte testing as well as validate the reagent used in the routine testing. Further, validation of the reagent can be conducted in real-time concurrently with the tests. The system can also validate dilution performance of the automated analyzer by determining if the particle concentration of the fluidic substance is within an expected range. The method of the present disclosure may be similarly implemented in the automated analyzer.

Due to the calibration of the universal calibration curve based on the reference grayscale value during each test cycle, the system and the method may provide results indicating the evaluation of the fluidic substance with relatively less deviation. Therefore, the system and the method may evaluate the fluidic substance with improved precision and repeatability over a plurality of test cycles as compared to the conventional systems and methods.

Adjustment of the test result values corresponding to the subsequent tests based on the corresponding deviations between the sample particle concentrations and the baseline particle concentration may compensate for dilution effect due to residual diluent carried over from previous tests. Adjusting the test result values of the subsequent tests may therefore enable the automated analyzer to generate improved test results that take into account the dilution effect caused by diluent carryover.

A variety of additional aspects will be set forth in the description that follows. These aspects can relate to individual features and to combinations of features. It is to be understood that both the foregoing summary and the following detailed description are exemplary and explanatory only and are not restrictive of the broad concepts upon which the embodiments disclosed herein are based.

BRIEF DESCRIPTION OF THE FIGURES

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

FIG. 21 is a flowchart illustrating a method of performing the plurality of tests via testing the plurality of fluidic substance samples, according to an embodiment of the present disclosure.

DETAILED DESCRIPTION

Figure 1:
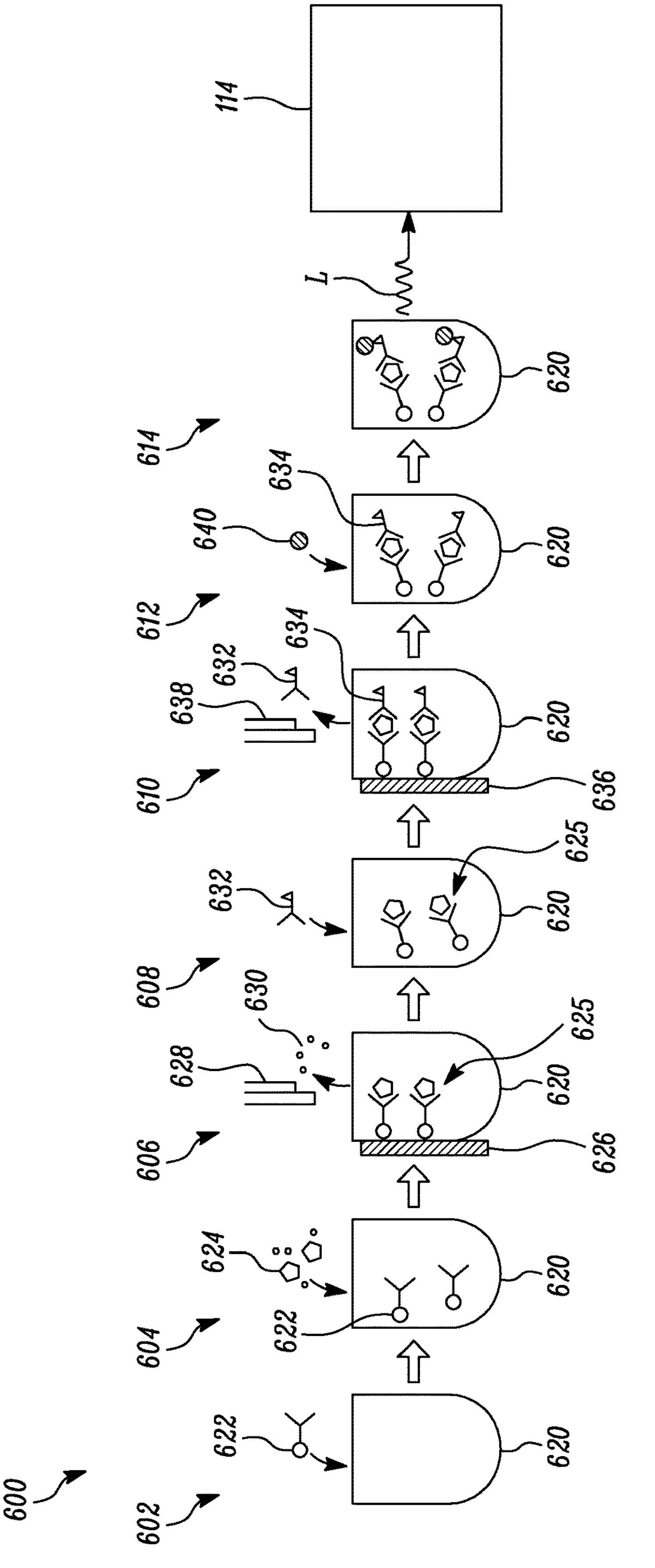
FIG. 1 is a schematic diagram illustrating an exemplary method for immunological analysis.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring now to Figures, FIG. 1 is a schematic diagram illustrating a method 600 for immunological analysis. The method 600 includes operations 602, 604, 606, 608, 610, 612, and 614. At operation 602, a cuvette 620 is transported to a predetermined position, and a first reagent including test particles 622 is dispensed into the cuvette 620. The test particles 622 may be magnetic or paramagnetic particles. The first reagent may be a chemical reactant, such as a chemiluminescent substrate or an alkaline phosphatase. In general, a reagent pipettor (not shown) aspirates the first reagent including the test particles 622 from a reagent vessel and dispenses the first reagent into the cuvette 620. In some embodiments, the cuvette 620 may be a reaction vessel and transported to a wash wheel (not shown).

At operation 604, a specimen 624 is dispensed into the cuvette 620. In general, a pipettor (not shown) aspirates the specimen 624 from a sample vessel (not shown) and dispenses the specimen 624 into the cuvette 620. Once the specimen 624 is dispensed into the cuvette 620, the cuvette 620 may be subjected to mixing, if required, so as to produce magnetic particle carriers 625 (shown at operation 606) each formed of the antigen (in the specimen 624) and the test particles 622 bonded together.

At operation 606, the cuvette 620 is subjected to a first cleaning process in which the magnetic particle carriers 625 are magnetically collected by a magnetic collecting unit 626, and a bound-free separation is carried out by a bound-free cleaning aspiration nozzle 628. As a result, an unreacted substance 630 in the cuvette 620 is removed.

At operation 608, a second reagent, such as a labeling reagent including a labeled antibody 632 is dispensed into the cuvette 620. As a result, immune complexes 634 (shown at the operation 606) each formed of the magnetic particle carrier 625 and the labeled antibody 632 bonded together are produced. At operation 610, a second bound-free cleaning process is performed to magnetically collect the magnetic particle carriers 625 by a magnetic collecting structure 636. Further, a bound-free separation is performed by a bound-free cleaning aspiration nozzle 638. As a result, the labeled antibody 632 that is not bonded with the magnetic particle carrier 625 is removed from the cuvette 620. At operation 612, a substrate including an enzyme 640 is dispensed into the cuvette 620, which is then mixed with the immune complex 634.

At operation 614, the enzyme 640 and the immune complex 634 are bonded together through the substrate reactions with the labeled antibody 632. In this operation, light "L" emitted from the immune complex 634 is measured by a photometric system, such as a luminometer 114. The luminometer 114 operates to calculate an amount of antigen, which is included in the specimen 624, based on the quantity of light "L" measured.

Figure 2:
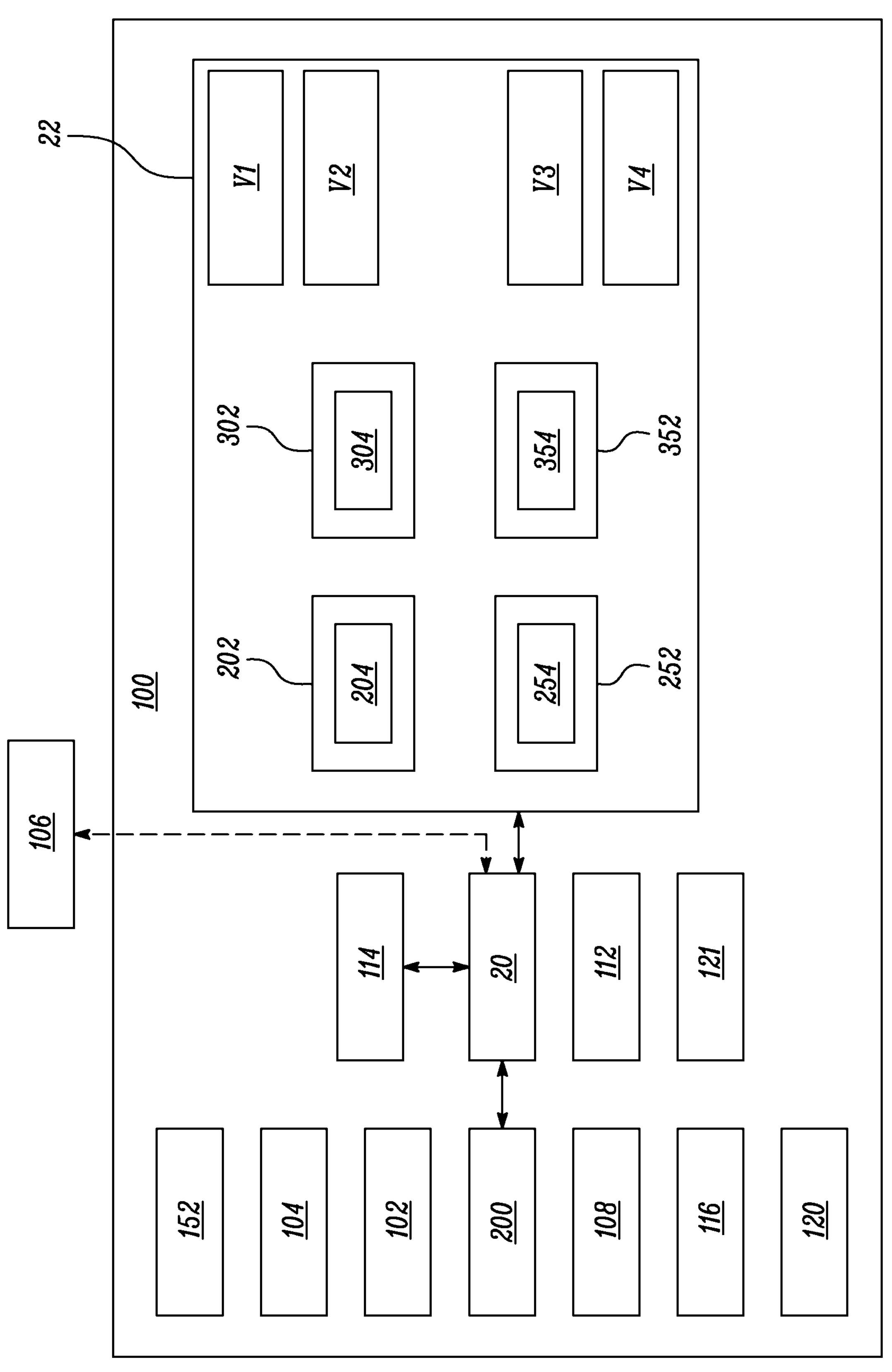
FIG. 2 is a block diagram of a system for evaluating a fluidic substance, according to an embodiment of the present disclosure.
Figure 3:
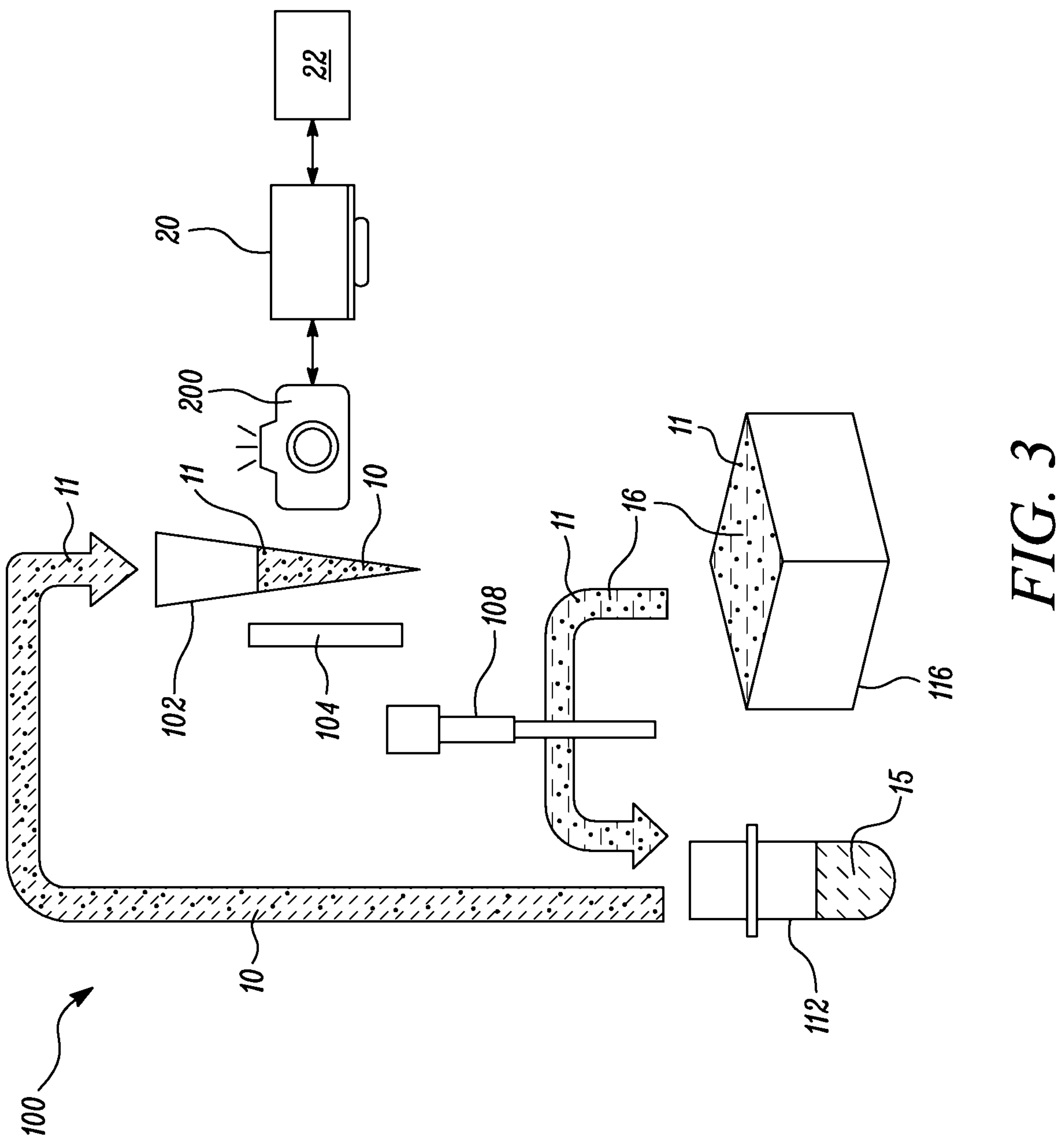
FIG. 3 is a schematic diagram of the system of FIG. 2, according to an embodiment of the present disclosure.

FIG. 2 illustrates a block diagram of a system 100 for evaluating a fluidic substance 10 (shown in FIG. 3) having particles 11, according to an embodiment of the present disclosure. The particles 11 may be similar to the test particles 622 shown in FIG. 1. FIG. 3 illustrates a schematic diagram of the system 100. Some components of the system 100 are not shown in FIG. 3 for illustrative purposes. In some cases, the system 100 may implement the method 600 of FIG. 1.

Some components and operations of the system 100 are not shown in FIGS. 2 and 3 for the purpose of clarity.

With reference to FIGS. 2 and 3, the system 100 includes a reagent pipettor 108 configured to dispense a diluent 15 into a dilution vessel 112. The diluent 15 may be a wash buffer solution. Specifically, the reagent pipettor 108 aspirates the diluent 15 from a diluent pack (not shown) and dispenses the aspirated diluent 15 into the dilution vessel 112. Further, the reagent pipettor 108 is configured to dispense a reagent 16 comprising the particles 11 into the dilution vessel 112. Specifically, the reagent pipettor 108 aspirates the reagent 16 from a reagent pack 116 and dispenses the aspirated reagent 16 into the dilution vessel 112. The reagent 16 may be a chemical reactant comprising an antibody which is meant to bond with an analyte (e.g., a patient sample) of interest that an assay or analyzer is meant to measure. In the illustrated embodiment of FIGS. 2 and 3, the reagent 16 includes paramagnetic particles or magnetic particles.

The fluidic substance 10 is formed via mixing the diluent 15 with the reagent 16 comprising the particles 11 in the dilution vessel 112.

The particles 11 in the fluidic substance 10 are paramagnetic particles or magnetic particles. In some embodiments, the diluent 15 and the reagent 16 are mixed by using an ultrasonic transducer. In some embodiments, the diluent 15 and the reagent 16 may be mixed by using an ultrasonic probe in direct or indirect contact with the fluidic substance 10, or any other suitable mixing apparatus. In other embodiments, the diluent 15 and the reagent 16 may be mixed by using a stirrer in direct contact with the fluidic substance 10. In some cases, mixing can be provided by attaching the ultrasonic probe to the reagent pipettor 108. The mixing of the diluent 15 with the reagent 16 is generally done for resuspension of the particles 11 in the mixture (i.e., the fluidic substance 10). Thus, mixing of the diluent 15 and the reagent 16 provides dispersion of the particles 11 in the fluidic substance 10.

In the illustrated embodiment of FIGS. 2 and 3, the fluidic substance 10 includes a mixture of at least the diluent 15 and the reagent 16 comprising the particles 11. In some embodiments, the fluidic substance 10 may include a mixture of a specimen sample, the diluent 15, and the reagent 16. In some embodiments, the fluidic substance 10 can be interchangeably referred to herein as "a fluidic substance sample 10".

The system 100 further includes a container 102 configured to contain an aspirated volume of the fluidic substance 10. Specifically, the container 102 aspirates a volume of the fluidic substance 10 from the dilution vessel 112 after the reagent 16 and the diluent 15 are mixed in the dilution vessel 112. In the illustrated embodiment of FIG. 3, the container 102 is a disposable tip. In some embodiments, the container 102 may be a test tube, or a vessel.

Figure 4:
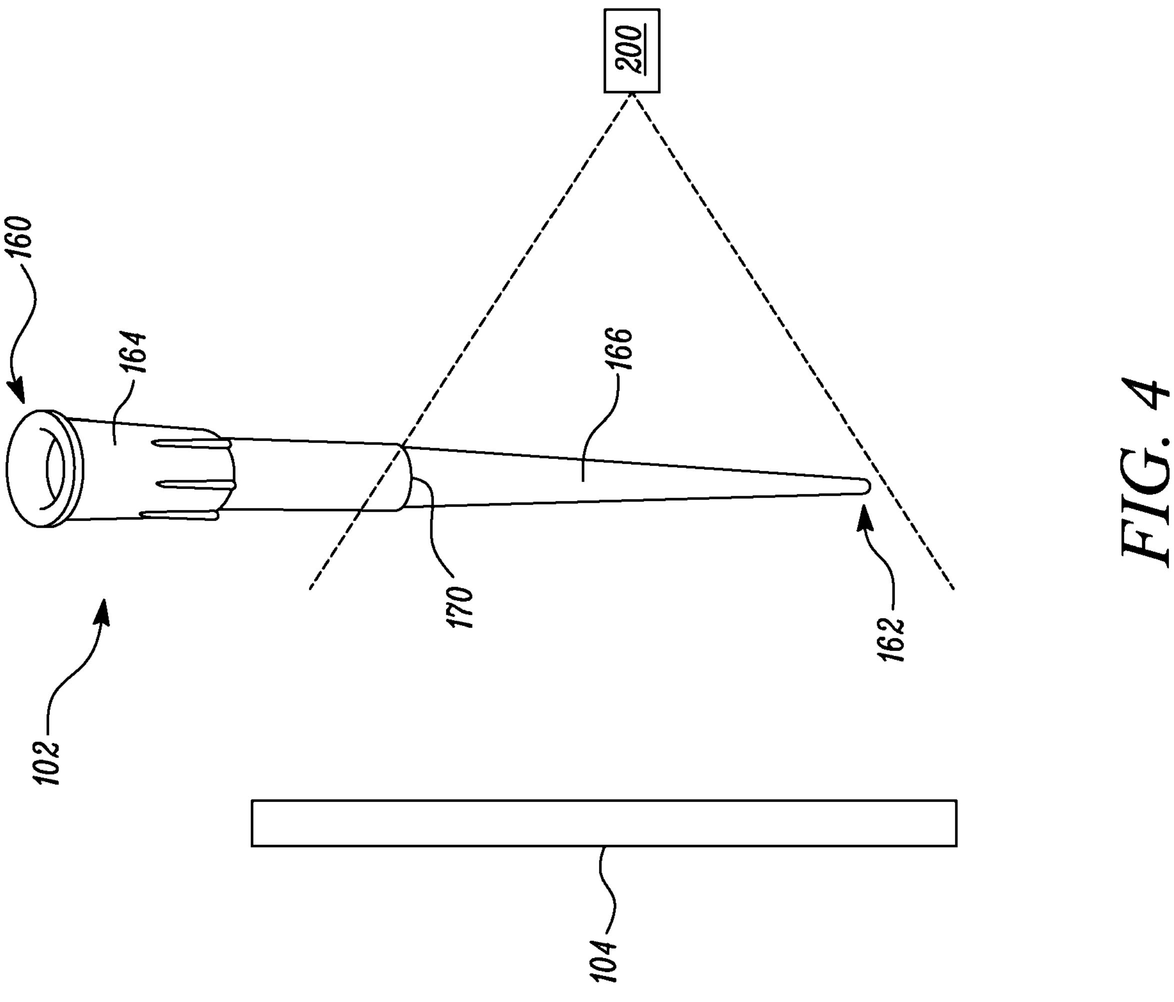
FIG. 4 is a schematic perspective view of a container of the system of FIG. 3, according to an embodiment of the present disclosure.
Figure 5:
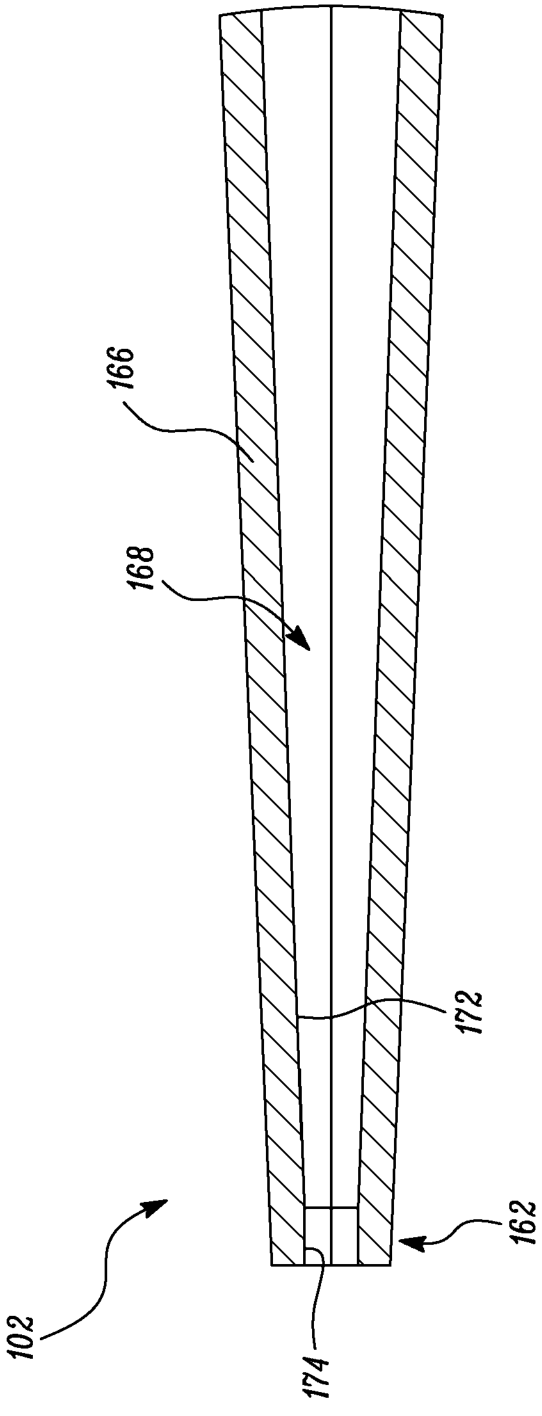
FIG. 5 is a cross sectional view of the container of FIG. 4, according to an embodiment of the present disclosure.

FIG. 4 illustrates a schematic perspective view of the container 102, according to an embodiment of the present disclosure. FIG. 5 illustrates a cross sectional view of the container 102. The container 102 illustrated in FIGS. 4 and 5 is a disposable tip. The container 102 extends from a proximal end 160 to a distal end 162. The container 102 includes a base portion 164 at the proximal end 160, which is configured to attach the container 102 to a mandrel (not shown). The container 102 further includes an elongated body portion 166 extending from the base portion 164. The container 102 including the base portion 164 and the body portion 166 defines a pipetting passage (or channel) 168 for aspirating, containing, and dispensing the fluidic substance 10. In some other embodiments, the container 102 may be non-disposable. In some other embodiments, the container 102 may be disposable but may further be reused. In some other embodiments, an image of the container 102 may be reused and compared against images of other such containers (e.g., an image of an empty first container may be compared to an image of the non-empty first container and/or be compared to an image of a non-empty second container, etc.). These variations may be applied to and/or incorporated within the other examples included in this disclosure.

In some embodiments, the container 102 includes a reference line 170 which is a detectable structure, such as a projection, a ridge, an indentation, a notch, or any other visible element. The reference line 170 can be formed in various locations of the container 102. In some embodiments, the reference line 170 is formed on the body portion 166 of the container 102. In other embodiments, the reference line 170 is formed on the base portion 164 of the container 102. Some examples of the reference line 170 are located such that a surface level or meniscus of the fluidic substance 10 aspirated in the container 102 is arranged between the reference line 170 and the distal end 162 of the container 102. In other embodiments, the reference line 170 is located such that the meniscus of the aspirated fluidic substance 10 is arranged above the reference line 170 relative to the distal end 162.

The reference line 170 is provided on the container 102 in various manners. In other embodiments, the reference line 170 is a marker or an indicator that is painted or attached on the container 102. The reference line 170 can be integrally formed or molded to the container 102. Alternatively, the reference line 170 is separately made and attached to the container 102. The reference line 170 is used as a reference point when an image of the container 102 is analyzed to determine if the fluidic substance 10 has been properly aspirated for a diagnostic or an analytic test.

As illustrated in FIG. 5, the pipetting passage 168 includes a tapered section 172 in which an inner diameter becomes smaller from the proximal end 160 to the distal end 162. The pipetting passage 168 further includes a straight section 174 that has a constant inner diameter at or adjacent to the distal end 162. The straight section 174 may improve accuracy and precision in aspirating a small volume of the fluidic substance 10.

Referring to FIGS. 2, 3, and 4, the system 100 further includes an image capture device 200 to capture one or more images of the container 102 at one or more locations. In some embodiments, the image capture device 200 is fixed at a particular location in the system 100. In other embodiments, the image capture device 200 is movably disposed in the system 100, which can move either independently from other components of the system 100 or together with one or more components of the system 100. In some embodiments, the image capture device 200 includes a camera (not shown). In some embodiments, the image capture device 200 may include one or more image sensors. In the illustrated embodiment of FIGS. 3 and 4, the system 100 includes only one image capture device 200. However, in other embodiments, the system 100 may include two or more image capture devices.

The system 100 further includes a processor 20 communicably coupled to the image capture device 200. The processor 20 may be a programmable analog and/or digital device that can store, retrieve, and process data. In an application, the processor 20 may be a controller, a control circuit, a computer, a workstation, a microprocessor, a microcomputer, a central processing unit, a server, or any suitable device or apparatus. The processor 20 is communicably coupled to a memory 22 of the system 100.

The system 100 further includes a screen 104 spaced apart from the image capture device 200. The container 102 is positioned between the image capture device 200 and the screen 104. The screen 104 is used to cast light back in the direction of a field of view (FOV) of the image capture device 200 by reflecting the light toward an aperture (not shown) of the image capture device 200. The screen 104 may be made of one or more various materials which can provide different reflection intensities. The screen 104 may include a retroreflective sheeting, one example of which includes 3M™ Scotchlite™ Sheeting 7610, available from 3M Company (Maplewood, MN).

Figure 6B:
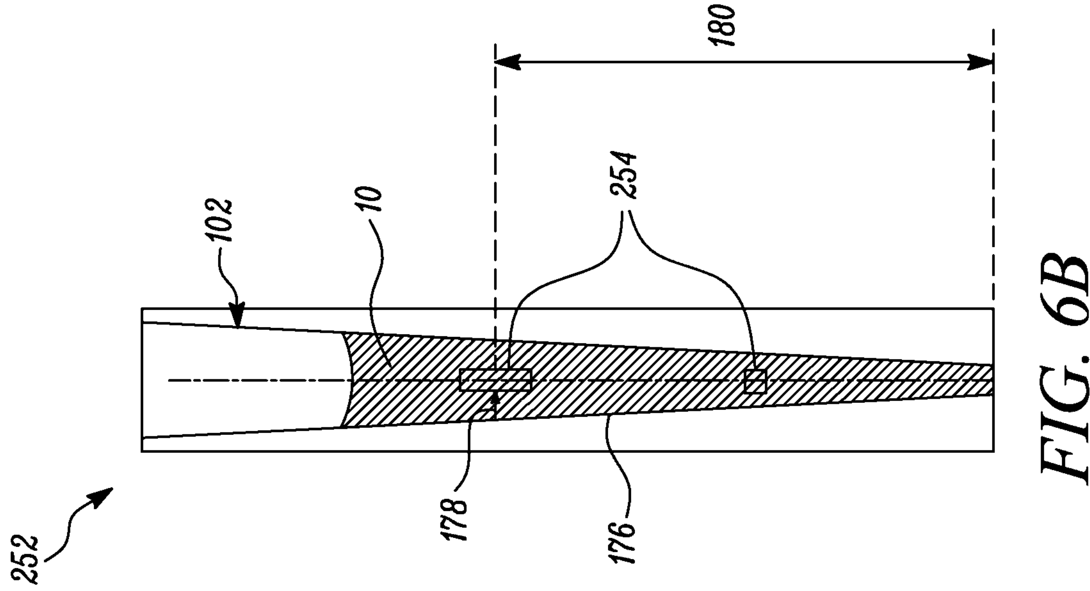
FIG. 6B is an image of a portion of the container of FIG. 4 containing an aspirated volume of a fluidic substance, according to an embodiment of the present disclosure.
Figure 6A:
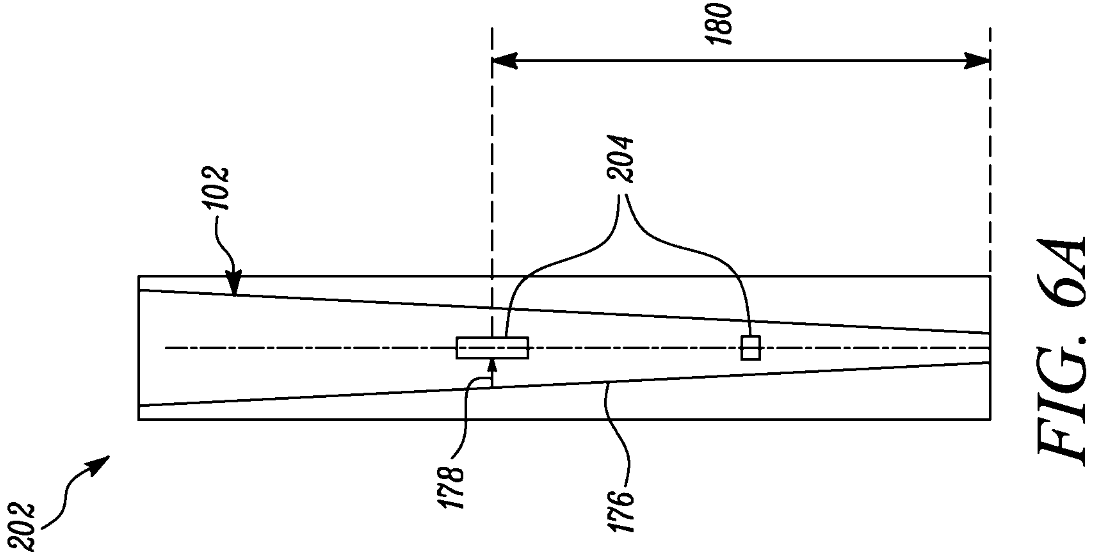
FIG. 6A is an image of a portion of the container of FIG. 4 in an empty state, according to an embodiment of the present disclosure.

In some cases, the screen 104 can be replaced by a light source (not shown), such that the container 102 is positioned between the image capture device 200 and the light source. The light source is used to illuminate the container 102 and its surroundings to be photographed as desired. In some cases, the system 100 may include both the screen 104 and the light source. With reference to FIGS. 2, 3 and 4, the image capture device 200 is configured to capture a reference image 202 (also shown in FIG. 6A) of at least a portion of the container 102 in an empty state. FIG. 6A illustrates the reference image 202 of the container 102 in the empty state. In the illustrated embodiment of FIG. 6A, the reference image 202 is an image of the body portion 166 (shown in FIG. 4) of the container 102 in the empty state. In other embodiments, the reference image 202 may be an image of one or more other sections or portions of the container 102 in the empty state. The reference image 202 is stored in the memory 22. The reference image 202 may be a grayscale digital image and/or a color image.

The processor 20 is further configured to determine one or more empty regions of interest 204 in the reference image 202 of the container 102. In general, a region of interest is a region of an image that is analyzed to determine a quality of a sample. The processor 20 may include an image processing software to determine the one or more empty regions of interest 204 in the reference image 202. One example of image processing methods may be implemented by Cognex In-Sight Vision Software, available from Cognex Corporation (Natick, MA), which provides various tools, such as edge detection ("Edge"), pattern matching ("Pattern Match"), and histogram analysis ("Histogram").

Once the reference image 202 is captured, the processor 20 uses a set of offset factors to determine the one or more empty regions of interest 204. In an example, the processor 20 finds a reference line associated with the container 102. In some embodiments, the reference line is a longitudinal edge 176 of the container 102 in the reference image 202. In other embodiments, other lines, or dimensional parameters of the container 102 can also be used as the reference line. The processor 20 locates a region that is located apart from the longitudinal edge 176 by a predetermined offset 178.

In some embodiments, the predetermined offset 178 determines a horizontal position of the empty region of interest 204 while a vertical position of the empty region of interest 204 is preset as a predetermined height 180 from a bottom of the reference image 202.

In some embodiments, the vertical position of the empty region of interest 204 remains generally identical among different images since the image capture device 200 is arranged repeatedly at a sample height relative to different containers.

In some embodiments, the one or more empty regions of interest 204 may be dynamically determined during calibration of the image capture device 200 upon initialization. In the illustrated embodiment of FIG. 6A, there are two empty regions of interest 204 in total.

In other embodiments, there may be only one empty region of interest 204, or there may be more than two empty regions of interest 204 in the reference image 202. In other embodiments, locations other than shown in FIG. 6A, may also be considered for the one or more empty regions of interest 204. The processor 20 is further configured to determine a reference grayscale value V1 (shown in FIG. 2) of at least a portion of the reference image 202. In some embodiments, at least the portion of the reference image 202 is the one or more empty regions of interest 204. In some embodiments, the processor 20 is configured to determine the reference grayscale value V1 as an average grayscale value of the one or more empty regions of interest 204.

Further, the reference grayscale value V1 is stored in the memory 22, as shown in FIG. 2. In general, each of the pixels that represents an image stored in a device has a pixel value (grayscale value) which describes how bright (i.e., how intense) that pixel is, and/or what color it should be. In the simplest case of binary images, the pixel value is a 1-bit number indicating either foreground or background. Thus, for the binary images, the pixels have only two possible intensity values. They are normally displayed as black and white. Numerically, the two values are often 0 for black, and either 1 or 255 for white. For grayscale images, the pixel value is a single number that represents the brightness (i.e., the intensity) of the pixel. The most common pixel format is the byte image, where this number is stored as an 8-bit integer giving a range of possible values from 0 to 255. Typically, zero is taken to be black, and 255 is taken to be white.

For color images, separate red, green, and blue components must be specified for each pixel (assuming an RGB color space), and the pixel value is actually a vector of three numbers. To determine the grayscale value of a region of interest on an image, a histogram is generated showing the number of pixels that have colors in each of a fixed list of color ranges. The histogram can be generated for any type of color space, such as RGB color model, CMYK color model, etc. To evaluate grayscale value of a region of interest on an image, pixel values may be determined for RGB color components for all pixels within that region of interest. In this manner, the grayscale values of each of the empty regions of interest 204 may be determined and their average is calculated to define the reference grayscale value V1 of the one or more empty regions of interest 204 in the reference image 202.

Grayscale images may be the result of measuring the intensity of light at each pixel according to a particular weighted combination of frequencies (or wavelengths), and in such cases they may be monochromatic proper when only a single frequency (in practice, a narrow band of frequencies) is captured. For the purposes of this application, the term "grayscale": may refer to a particular weighted combination of frequencies (or wavelengths) or may refer to a monochromatic frequency (or wavelength); may carry intensity information; and/or may refer to a colorimetric (or more specifically photometric) grayscale image that has a defined grayscale color space. FIG. 6B illustrates a test image 252 of the container 102 containing the aspirated volume of the fluidic substance 10. The image capture device 200 is configured to capture the test image 252 of the container 102 containing the aspirated volume of the fluidic substance 10. The test image 252 is an image of a portion of the container 102 that is filled with the fluidic substance 10. The test image 252 is stored in the memory 22 (shown in FIG. 2). The test image 252 may be a grayscale digital image and/or a color image.

The processor 20 is further configured to determine one or more test regions of interest 254 in the test image 252 of the container 102. The offset factors, where were used to determine the one or more empty regions of interest 204, are again used by the processor 20 to determine the one or more test regions of interest 254 in the test image 252. In some embodiments, the one or more test regions of interest 254 may be dynamically determined during calibration of the image capture device 200 upon initialization. In the illustrated embodiment of FIG. 6B, there are two test regions of interest 254 in total. In some embodiments, the one or more test regions of interest 254 are same as the one or more empty regions of interest 204. In some embodiments, there may be only one test region of interest 254, or there may be more than two test regions of interest 254 in the test image 252. In some embodiments, locations other than shown in FIG. 6B, may also be considered for the one or more test regions of interest 254. In some embodiments, the one or more test regions of interest 254 in the test image 252 may be determined based on the aspirated volume of the fluidic substance 10.

The processor 20 (shown in FIG. 2) is further configured to determine a test grayscale value V2 (shown in FIG. 2) of at least a portion of the test image 252. In some embodiments, at least the portion of the test image 252 is the one or more test regions of interest 254.

In some embodiments, the processor 20 is configured to determine the test grayscale value V2 as an average grayscale value of the one or more test regions of interest 254. Specifically, the grayscale values of each of the test regions of interest 254 are determined and their average is calculated to define the test grayscale value V2 of the one or more test regions of interest 254 in the test image 252. Further, the test grayscale value V2 is stored in the memory 22, as shown in FIG. 2.

Figure 7:
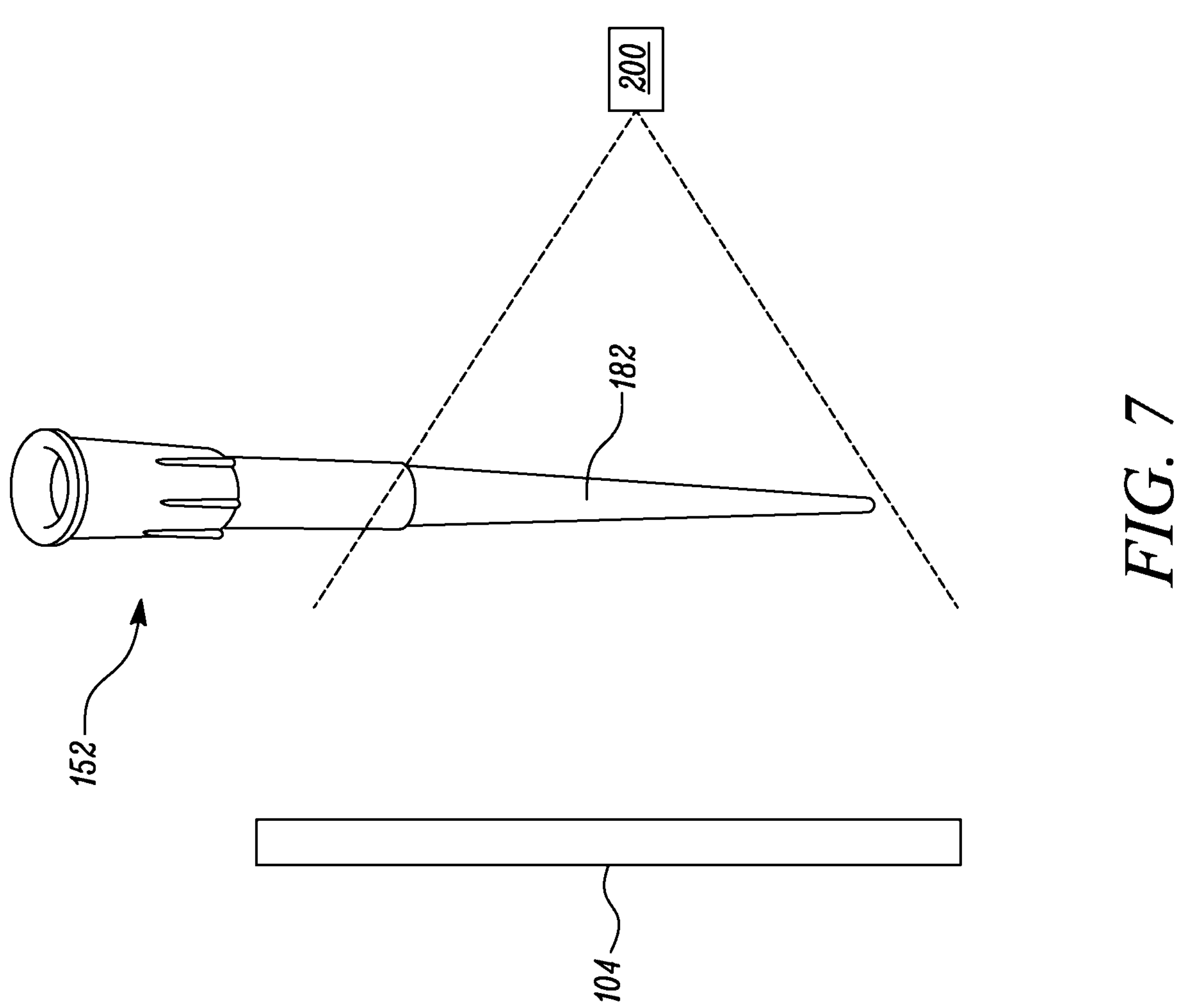
FIG. 7 is a schematic perspective view of a trial container of the system of FIG. 3, according to an embodiment of the present disclosure.
Figure 8B:
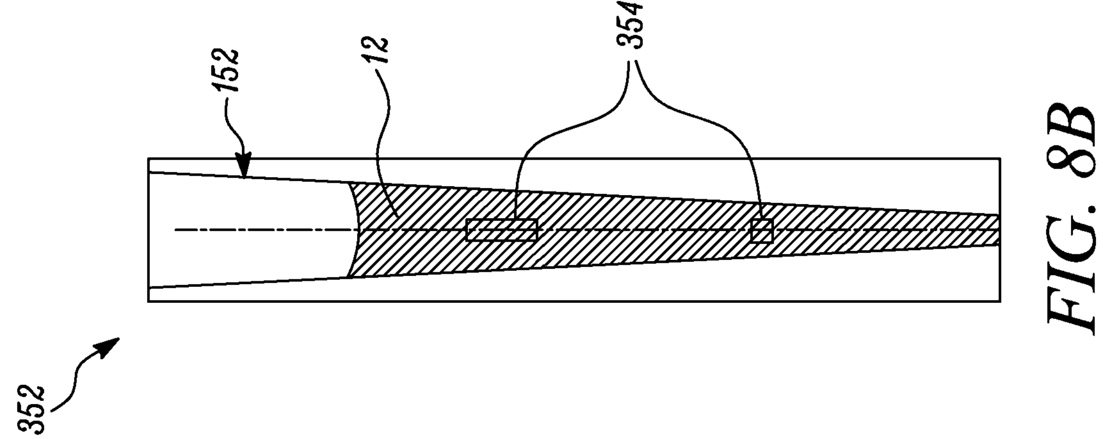
FIG. 8B is an image of a portion of the trial container of FIG. 7 containing an aspirated volume of a trial fluidic substance, according to an embodiment of the present disclosure.
Figure 8A:
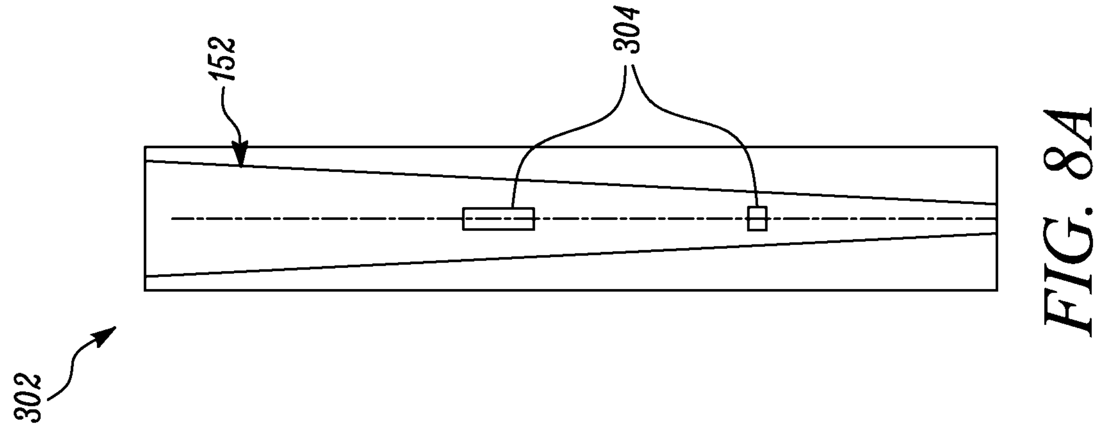
FIG. 8A is an image of a portion of the trial container of FIG. 7 in an empty state, according to an embodiment of the present disclosure.

FIG. 7 illustrates a schematic perspective view of a trial container 152 according to an embodiment of the present disclosure. With respect to construction and dimensional features, in the illustrated embodiment, the trial container 152 is substantially similar to the container 102 illustrated in FIG. 4. In other embodiments, the trial container 152 may differ in geometry from the container 102 of FIG. 4. FIG. 8A illustrates a baseline image 302 of the trial container 152 in the empty state. FIG. 8B illustrates a trial image 352 of the trial container 152 containing an aspirated volume of a trial fluidic substance 12.

Referring to FIGS. 7, 8A, and 8B, in some embodiments, the system 100 is further configured to conduct a plurality of trials. For each trial, the system 100 further includes the trial container 152 configured to contain the aspirated volume of the trial fluidic substance 12 (shown in FIG. 8B) comprising the particles 11.

For each trial, the image capture device 200 is further configured to capture the baseline image 302 of at least a portion of the trial container 152 in an empty state. In the illustrated embodiment of FIG. 8A, the baseline image 302 is an image of a body portion 182 of the trial container 152 in the empty state. In other embodiments, the baseline image 302 may be an image of one or more other sections or portions of the trial container 152 in the empty state. The baseline image 302 is stored in the memory 22. The baseline image 302 may be a grayscale digital image and/or a color image.

The processor 20 (shown in FIG. 2) is further configured to determine one or more regions of interest 304 in the baseline image 302 of the trial container 152. A logic to determine the regions of interest 304 in the baseline image 302 is same as the logic used to determine the empty regions of interest 204 in the reference image 202 of the container 102 (shown in FIG. 6A). In the illustrated embodiment of FIG. 8A, there are two regions of interest 304 in total. In other embodiments, there may be only one region of interest 304, or there may be more than two regions of interest 304 in the baseline image 302. In other embodiments, locations other than shown in FIG. 8A, may also be considered for the one or more regions of interest 304 in the baseline image 302.

For each trial, the processor 20 is further configured to determine a baseline grayscale value V3 (shown in FIG. 2) of at least a portion of the baseline image 302. In some embodiments, at least the portion of the baseline image 302 is the one or more regions of interest 304 in the baseline image 302. In some embodiments, the processor 20 is configured to determine the baseline grayscale value V3 as an average grayscale value of the one or more regions of interest 304. Further, the baseline grayscale value V3 is stored in the memory 22, as shown in FIG. 2.

For each trial, the image capture device 200 is further configured to capture the trial image 352 of the trial container 152 containing the aspirated volume of the trial fluidic substance 12. The trial image 352 is an image of a portion of the trial container 152 that is filled with the trial fluidic substance 12. The trial image 352 is stored in the memory 22. The trial image 352 may be a grayscale digital image and/or a color image.

In some embodiments, for each trial, the trial fluidic substance 12 is formed via mixing the diluent 15 with the reagent 16 comprising the particles 11. Further, the particles 11 in the trial fluidic substance 12 are paramagnetic particles or magnetic particles.

The processor 20 is further configured to determine one or more regions of interest 354 in the trial image 352 of the trial container 152. A logic to determine the regions of interest 354 in the trial image 352 is same as the logic used to determine the regions of interest 304 in the baseline image 302 (shown in FIG. 8A) of the trial container 152. In the illustrated embodiment of FIG. 8B, there are two regions of interest 354 in total. In other embodiments, there may be only region of interest 354, or there may be more than two regions of interest 354 in the trial image 352. In other embodiments, locations other than shown in FIG. 8B, may also be considered for the one or more regions of interest 354 in the trial image 352. For each trial, the processor 20 is further configured to determine a trial grayscale value V4 (shown in FIG. 2) of at least a portion of the trial image 352. Specifically, the processor 20 is further configured to determine the trial grayscale value V4 of at least a portion of the trial image 352 by using the baseline grayscale value V3 as a reference. In some embodiments, at least the portion of the trial image 352 is the one or more regions of interest 354 in the trial image 352. In some embodiments, the processor 20 is configured to determine the trial grayscale value V4 as an average grayscale value of the one or more regions of interest 354 in the trial image 352. Further, the trial grayscale value V4 is stored in the memory 22, as shown in FIG. 2.

For each trial, the processor 20 is further configured to determine a trial particle concentration P2 (shown in FIG. 9) in the trial fluidic substance 12 based on signals received from a spectrophotometer 106 (shown in FIG. 2). The spectrophotometer 106 may be communicably coupled to the processor 20. Further, the spectrophotometer 106 may be an external component separate from the system 100. In general, the spectrophotometer 106 is used for conducting the plurality of trials and further generating a calibration curve for evaluating a sample. For determining the trial particle concentration P2 in the trial fluidic substance 12, the spectrophotometer 106 performs a quantitative measurement of reflection or transmission properties of the particles in the trial fluidic substance 12 as a function of wavelength. The spectrophotometer 106 is configured to determine the trial particle concentration P2 corresponding to the trial grayscale value V4. In some embodiments, for each trial, the processor 20 is further configured to record the trial particle concentration P2 corresponding to the plurality of trials. In other words, for each trial, the processor 20 is configured to record the trial particle concentration P2 corresponding to the trial grayscale value V4.

In some cases, for each trial, the trial fluidic substance 12 may be made separately to provide different concentrations of particles in the plurality of trials. In some other cases, serial dilutions may also be considered. In serial dilutions, a known sample of the reagent 16 is diluted down with the diluent 15 in a stepwise manner to make lower concentrations of the trial fluidic substance 12. The next sample of the trial fluidic substance 12 is made from the previous dilution, and the dilution factor is often kept constant.

Figure 9:
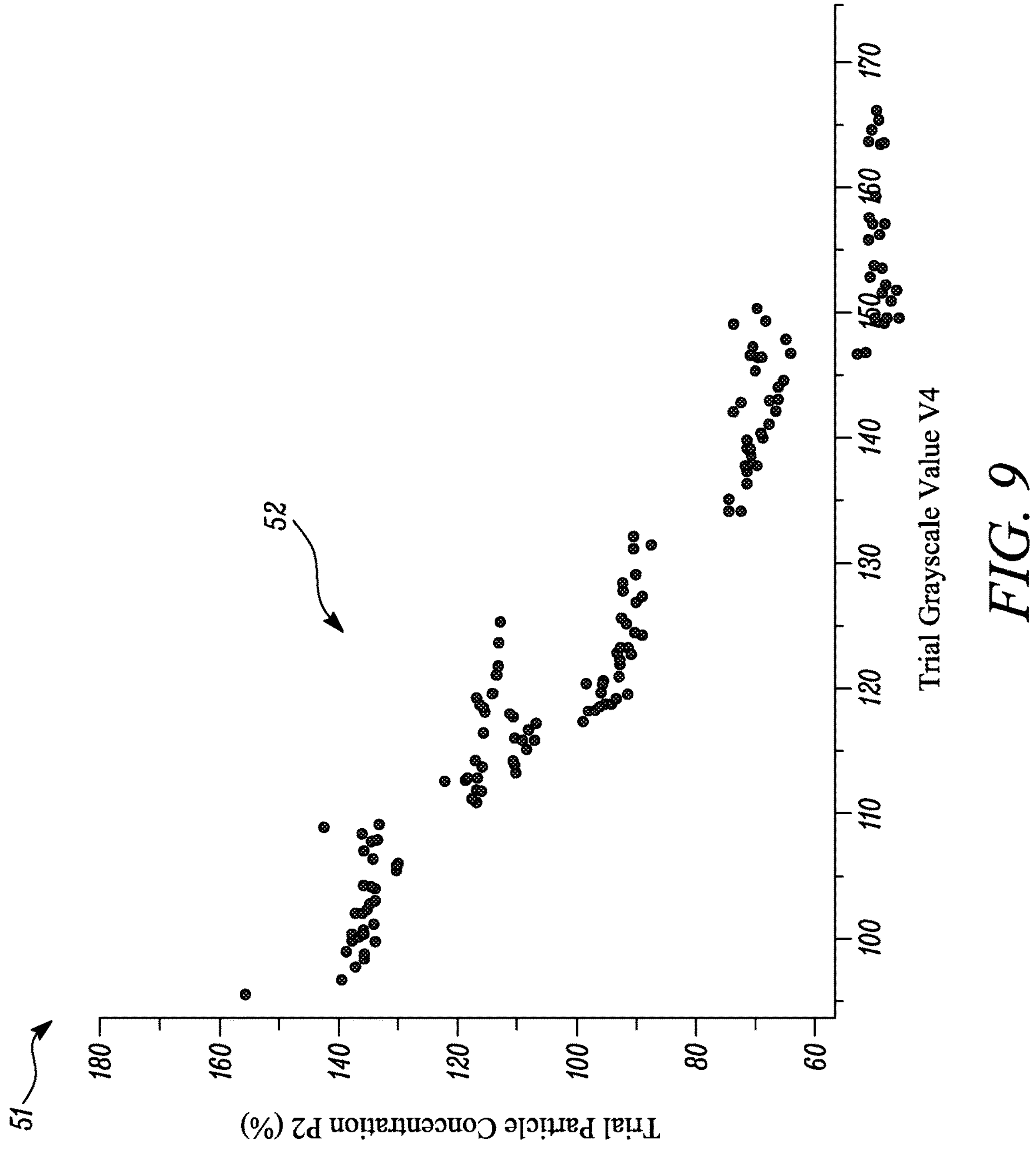
FIG. 9 is a graph illustrating a plot between trial grayscale values and trial particle concentrations corresponding to plurality of trials conducted by the system of FIG. 2, according to an embodiment of the present disclosure.

FIG. 9 is a graph 51 illustrating a plot 52 between the trial grayscale values V4 and the trial particle concentrations P2 corresponding to the plurality of trials conducted by the system 100, according to an embodiment of the present disclosure. In some embodiments, the processor 20 is further configured to generate the plot 52 between the trial grayscale values V4 and the trial particle concentrations P2 corresponding to the plurality of trials. The plot 52 is depicted by plotting the trial particle concentrations P2 versus the corresponding trial grayscale values V4 for the corresponding plurality of trials. The trial particle concentrations P2 are depicted in percentage (%) on the ordinate. The trial grayscale values V4 are depicted on the abscissa.

Figure 10:
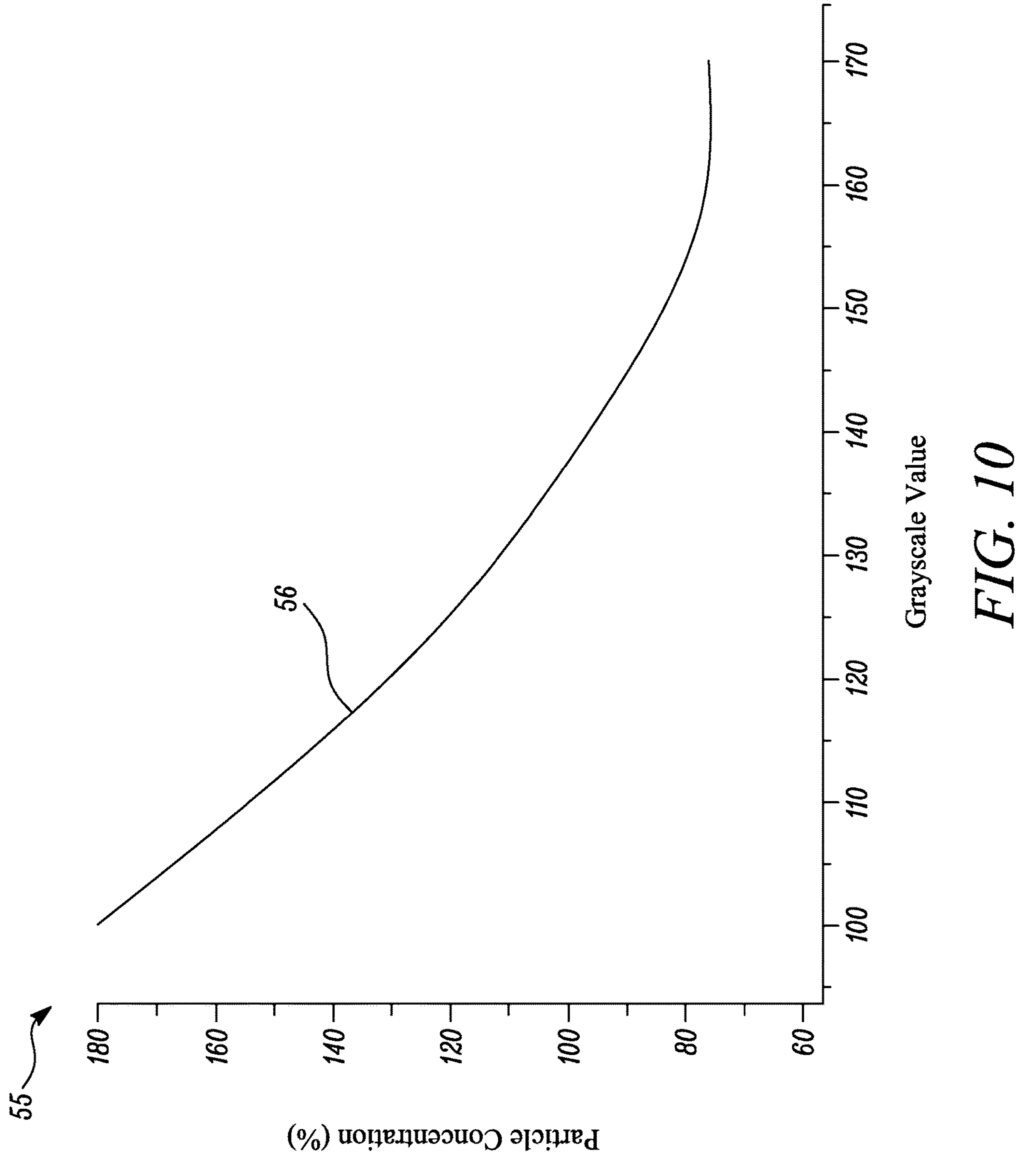
FIG. 10 is a graph illustrating a universal calibration curve generated from the plot of FIG. 9, according to an embodiment of the present disclosure.

FIG. 10 is a graph 55 illustrating a universal calibration curve 56 generated from the plot 52 of FIG. 9, according to an embodiment of the present disclosure. The plot 52 is further generated by conducting the plurality of trials, described with reference to FIGS. 7, 8A, 8B, and Therefore, in some embodiments, the system 100 is configured to conduct the plurality of trials to generate the universal calibration curve 56.

The processor 20 is further configured to generate the universal calibration curve 56 from the plot 52 (shown in FIG. 9). The universal calibration curve 56 relates particle concentration and grayscale value. The particle concentration is depicted in percentage on the ordinate and the grayscale value is depicted on the abscissa. In general, a calibration curve is used for determining a concentration of a substance in an unknown sample by comparing the unknown to a set of standard samples of known concentration. Further, a calibration curve is generated to understand an instrument response to a known sample of a fluidic substance and predict particle concentration in an unknown sample of a fluidic substance.

Regression modeling may be used for generating the universal calibration curve 56 from the plot 52. Further, weighted least squares linear regression may also be used to improve the sensitivity and accuracy of the universal calibration curve 56.

Once the plurality of trials is conducted to generate the universal calibration curve 56, the processor 20 is further configured to calibrate the universal calibration curve 56 relating the particle concentration and the grayscale value based on the reference and test grayscale values V1, V2 (described with reference to FIGS. 2, 6A, and 6B). In some embodiments, the processor 20 is configured to calibrate the universal calibration curve 56 by utilizing the reference grayscale value V1 and the test grayscale value V2 to adjust an output of the universal calibration curve 56.

In some embodiments, the output of the universal calibration curve 56 may be adjusted by shifting a shape of the universal calibration curve 56 based on the reference and test grayscale values V1, V2. In other embodiments, the output of the universal calibration curve 56 may be adjusted by shifting a position of the universal calibration curve 56 based on the reference and test grayscale values V1, V2.

Figure 11:
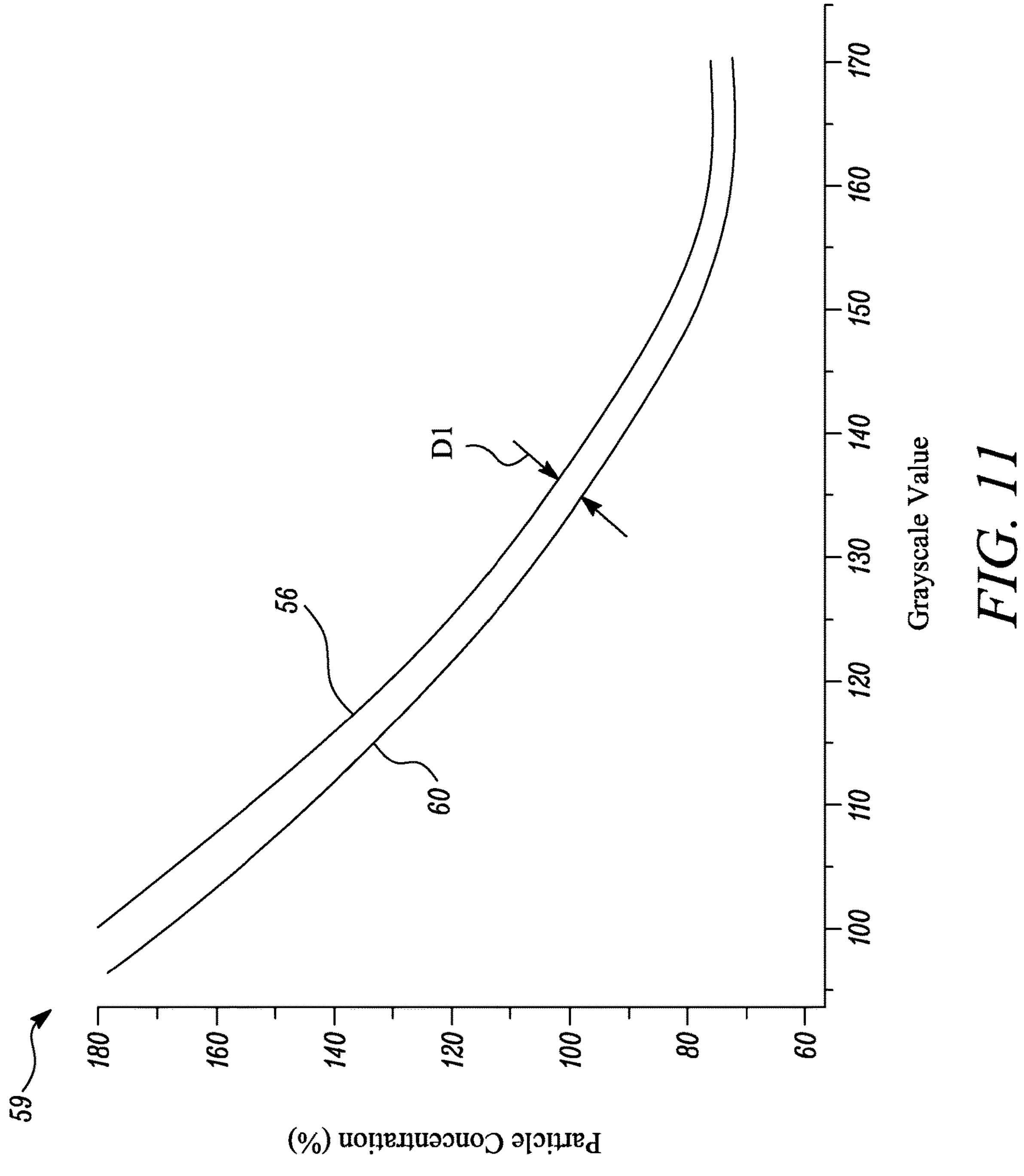
FIG. 11 is a graph illustrating the universal calibration curve of FIG. 10 and a calibrated universal calibration curve generated from the universal calibration curve, according to an embodiment of the present disclosure.

FIG. 11 is a graph 59 illustrating the universal calibration curve 56 and a calibrated universal calibration curve 60, according to an embodiment of the present disclosure. The processor 20 is configured to calibrate the universal calibration curve 56 to generate the calibrated universal calibration curve 60. In some embodiments, by using an analytical model, the processor calibrates the universal calibration curve 56 based on the reference and test grayscale values V1, V2 to generate the calibrated universal calibration curve 60. Further, adjustment of the output of the universal calibration curve 56 is depicted by an average deviation "D1" between the universal calibration curve 56 and the calibrated universal calibration curve 60. The processor 20 is further configured to determine a particle concentration P1 in the fluidic substance 10 (shown in FIG. 3) based on the test grayscale value V2 (shown in FIG. 2) and the calibrated universal calibration curve 56.

Figure 12:
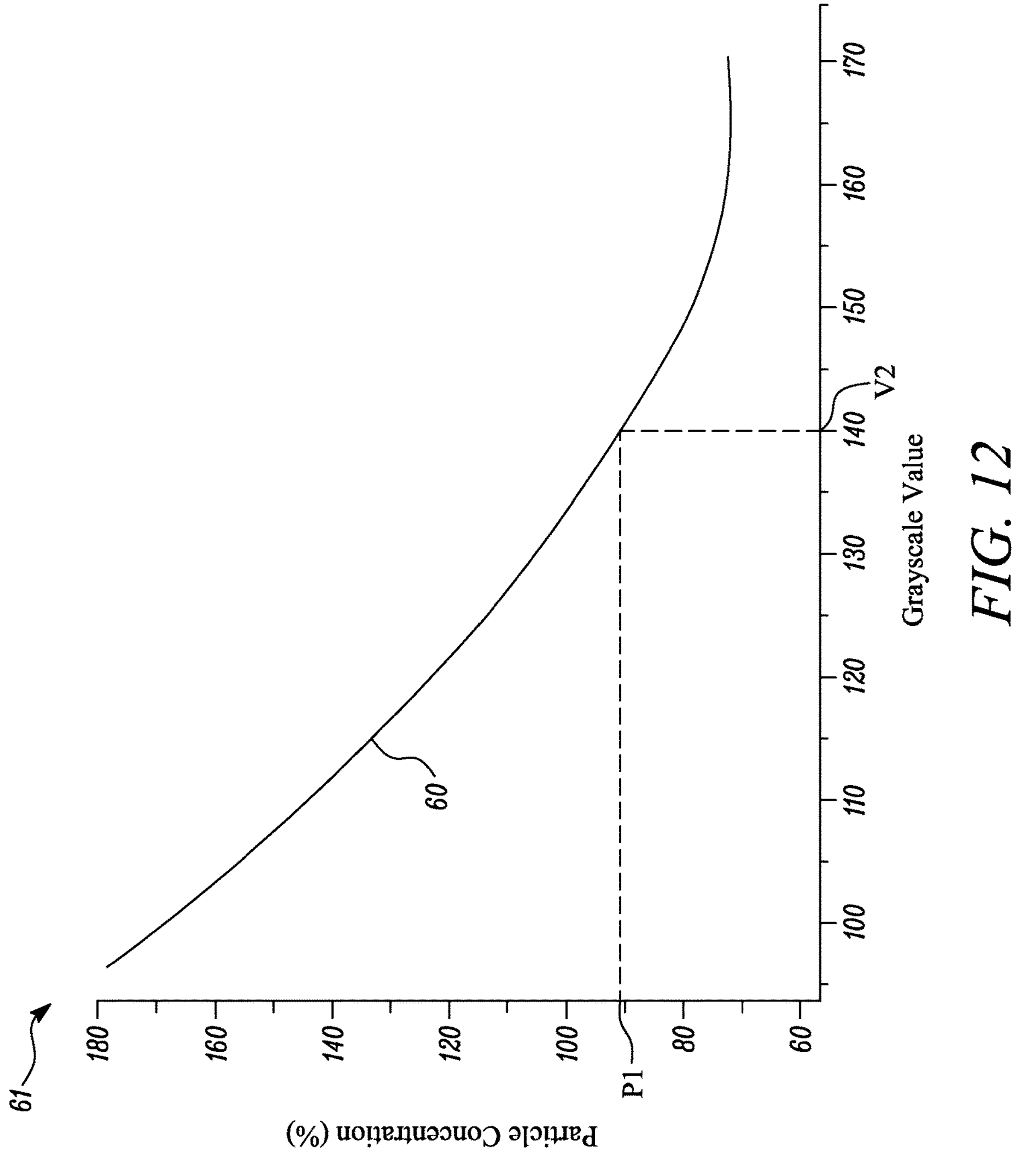
FIG. 12 is another graph illustrating the calibrated universal calibration curve, according to an embodiment of the present disclosure.

FIG. 12 is a graph 61 illustrating the calibrated universal calibration curve 60 for determining the particle concentration P1 in the fluidic substance 10. In some embodiments, the processor 20 is configured to convert the test grayscale value V2 to the particle concentration P1 by applying the calibrated universal calibration curve 60 in order to determine the particle concentration P1 in the fluidic substance 10. In an exemplary embodiment illustrated by the graph 61, for the test grayscale value V2 equal to 140, the particle concentration P1 in the fluidic substance 10 is about 90%. Therefore, based on the test grayscale value V2 and the calibrated universal calibration curve 60, the particle concentration P1 in the fluidic substance 10 can be determined. In this way, the system 100 including the processor 20 evaluates the fluidic substance 10.

Calibrating the universal calibration curve 56 based on the reference and test grayscale values V1, V2 may take into account variation between different containers 102 (shown in FIG. 3) and variability in the image capture device 200. Specifically, the calibrated universal calibration curve 60 is determined by using both the reference grayscale value V1 corresponding to the container 102 in the empty state and the test grayscale value V2 corresponding to the container 102 containing the aspirated volume of the fluidic substance 10. This may account for any variation in the container 102 from other containers and variability in the image capture device 200. The variation in the container 102 may be related to dimensions, shape, and/or optical properties of the container 102. Using the calibrated universal calibration curve 60 to determine the particle concentration P1 may therefore improve an accuracy of the evaluation of the fluidic substance 10.

Figure 13:
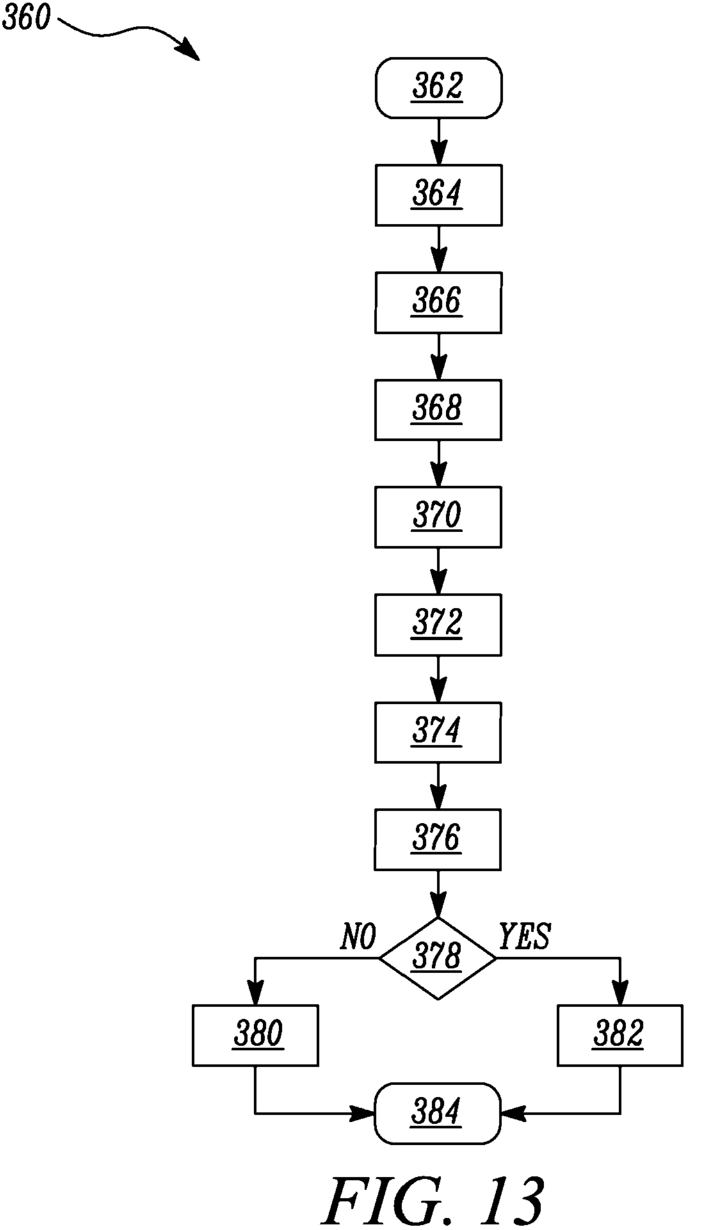
FIG. 13 is a flowchart of a process to determine particle concentration in the fluidic substance aspirated in the container of FIG. 4, according to an embodiment of the present disclosure.

FIG. 13 is a flowchart of a process 360 to determine the particle concentration P1 in the fluidic substance 10 (shown in FIG. 3) aspirated in the container 102 (shown in FIG. 4), according to an embodiment of the present disclosure. The process 360 is embodied as a machine learning algorithm implemented by the system 100 (shown in FIG. 2) including the processor 20. Further, the process 360 may be stored in the memory 22.

At operation 362, the process 360 begins. Referring now to FIGS. 4 and 6A, at operation 364, the image capture device 200 is configured to capture the reference image 202 of at least a portion (i.e., the body portion 166) of the container 102 in the empty state. The process 360 further moves to operation 366.

At operation 366, the processor 20 is configured to determine the reference grayscale value V1 of at least a portion of the reference image 202. Specifically, the processor 20 determines the reference grayscale value V1 of the one or more empty regions of interest 204 in the reference image 202. The process 360 further moves to operation 368.

Referring to FIG. 3, at operation 368, the container 102 is configured to aspirate a volume of the fluidic substance 10. In some embodiments, the fluidic substance 10 includes a mixture of at least the diluent 15 and the reagent 16 comprising the particles 11. The process 360 further moves to operation 370. Referring now to FIGS. 4 and 6B, at operation 370, the image capture device 200 is configured to capture the test image 252 of the container 102 containing the aspirated volume of the fluidic substance 10. The process 360 further moves to operation 372.

At operation 372, the processor 20 is configured to determine the test grayscale value V2 of at least a portion of the test image 252. Specifically, the processor 20 determines the test grayscale value V2 of the one or more test regions of interest 254 in the test image 252. The process 360 further moves to operation 374.

Referring to FIGS. 10 and 11, at operation 374, the processor 20 is configured to calibrate the universal calibration curve 56 relating the particle concentration and the grayscale value based on the reference and test grayscale values V1, V2. In other words, based on the reference and test grayscale values V1, V2, the processor 20 calibrates the universal calibration curve 56 to generate the calibrated universal calibration curve 60. The process 360 further moves to operation 376.

Referring to FIGS. 2 and 12, at operation 376, the processor 20 is configured to determine the particle concentration P1 in the fluidic substance 10 based on the test grayscale value V2 and the calibrated universal calibration curve 60. The processor 20 converts the test grayscale value V2 to the particle concentration P1 by applying the calibrated universal calibration curve 60. The process 360 further moves to operation 378.

At operation 378, the processor 20 determines whether the determined particle concentration P1 is within a tolerance range. In some embodiments, the tolerance range is determined based on an allowable deviation from a target particle concentration in the fluidic substance 10 that is intended to be present in the aspirated volume of the fluidic substance 10. When the particle concentration P1 is within the tolerance range, the process 360 moves to operation 382. At operation 382, the processor 20 is configured to generate a flagging result comprising a pass. Thus, the aspirated volume of the fluidic substance 10 may be considered appropriate for use in an analyzer. Further, the process 360 moves to operation 384 where the process 360 is terminated. When the particle concentration P1 is outside the tolerance range, the process 360 moves to operation 380. At operation 380, the processor 20 is configured to generate a flagging result comprising a fail. Thus, the aspirated volume of the fluidic substance 10 may be considered inappropriate for use in an analyzer. Further, the process 360 moves to operation 384 where the process 360 is terminated. Therefore, in some embodiments, the processor 20 is configured to generate a flagging result based on the particle concentration P1 in the fluidic substance 10. The flagging result (the operations 380 and 382) is indicative of a quality of the fluidic substance 10. The flagging result corresponding to the operation 380 indicates that the aspirated volume of the fluidic substance 10 is inappropriate and may lead to erroneous results upon being used in an analyzer. The flagging result corresponding to the operation 382 indicates that the aspirated volume of the fluidic substance 10 can be used for routine testing in an analyzer. Therefore, in some embodiments, the flagging result comprises a pass (i.e., the operation 382) or a fail (i.e., the operation 380).

In some embodiments, the quality of the fluidic substance 10 is indicative of a dispersion of the particles in the fluidic substance 10. Therefore, during the operation 380, the flagging result may indicate that the particles 11 in the aspirated volume of the fluidic substance 10 are not properly dispersed.

In some embodiments, during the operation 380, the flagging result includes an error flag when a magnitude of a difference between an expected particle concentration and the particle concentration P1 based on the test grayscale value V2 and the calibrated universal calibration curve 60 is greater than 20% of the expected particle concentration. The expected particle concentration may correspond to a particle concentration within the tolerance range. Further, the expected particle concentration may also correspond to a particle concentration according to standard specifications. In some cases, the expected particle concentration may correspond to an ideal or a rated particle concentration that is appropriate for carrying out tests in an analyzer. If the particle concentration P1 determined based on the test grayscale value V2 and the calibrated universal calibration curve 60 is within an allowable tolerance from the expected particle concentration, then the fluidic substance 10 may be appropriate for testing.

In some embodiments, during the operation 380, the flagging result includes an error flag when the magnitude of the difference between the expected particle concentration and the particle concentration P1 based on the test grayscale value V2 and the calibrated universal calibration curve 60 is greater than 10% of the expected particle concentration.

In some embodiments, during the operation 380, the flagging result includes an error flag when a magnitude of a difference between the particle concentration P1 and 0.01 mg/ml is greater than 10% of 0.01 mg/ml. In other words, the flagging result includes an error flag when the magnitude of the difference between the particle concentration P1 and 0.01 mg/ml is greater than 0.001 mg/ml.

In some embodiments, during the operation 380, the flagging result includes an error flag when the particle concentration P1 is greater than 0.0115 mg/ml. In some embodiments, during the operation 380, the flagging result includes an error flag when the particle concentration P1 is less than 0.0085 mg/ml.

By determining the concentration of the particles in the fluidic substance 10 based on the test grayscale value V2 and the calibrated universal calibration curve 60, the system 100 may check the dispersion of the particles in the fluidic substance 10. In an example, the particle concentration P1 within the tolerance range may indicate that the particles 11 are effectively dispersed in the fluidic substance 10. In such a case, the fluidic substance 10 having the particles 11 may be used in an assay or analyzer for testing one or more patient samples. In another example, the particle concentration P1 outside the tolerance range may indicate that the particles 11 are not properly dispersed in the fluidic substance 10. In such a case, the fluidic substance 10 cannot be used in an assay or analyzer. Therefore, the system 100 including the processor 20 and the image capture device 200 may be used to determine the quality of the fluidic substance 10, which may further validate the dispersion of the particles 11 in the fluidic substance 10. In case of an improper dispersion of the particles 11 in the fluidic substance 10, the system 100 may flag an error result indicating that the fluidic substance 10 should not be used in an assay or analyzer. The fluidic substance 10 with improper particle dispersion implies a fault in the resuspension of the particles 11 in the fluidic substance 10.

Improper particle dispersion may indicate that there is a fault in a laboratory instrument or a hardware component. In an example, there may be a fault in handling of the fluidic substance 10 in a vessel or a probe or a pipettor. Various steps can be performed to timely rectify the fault, such as, replacing an ultrasonic probe which was used for ultrasonic mixing, replacing a tip of the ultrasonic probe and/or the reagent pipettor 108, replacing an ultrasonic transducer linked with the reagent pipettor 108, or recalibrating the ultrasonics of a mixing apparatus. Further, a service engineer may be called to rectify the fault in the instrument. To rectify the fault, a troubleshooting program may also be initiated. In an example, an automated system diagnostic (ASD) tool may be integrated in a troubleshooting wizard to diagnose the fault in the laboratory instrument or the hardware component. Many other diagnostic routines may be stored with the system 100 onboard an analyzer. Such steps to timely rectify the fault in the laboratory instrument may further result in a relatively lower laboratory downtime. Therefore, the system 100 including the processor 20 may validate the resuspension of the particles 11 in the fluidic substance 10, and this validation can be further used to reduce an overall maintenance and repair time for rectifying the error in case of faulty resuspension.

Further, the system 100 does not require any additional chemical and/or biological ingredients to evaluate the fluidic substance 10 using the particle concentration P1. Moreover, no chemical/biological reaction is required for evaluating the fluidic substance 10. Thus, the system 100 follows an easy and simple method to evaluate the fluidic substance 10. The system 100 can regularly evaluate the fluidic substance 10 for a number of diagnostic tests and may therefore result in a quick turnaround time to take any necessary steps in case of detection of a fault. An error in a test result from an assay or an analyzer can be eliminated or minimized if the particle resuspension and the particle dispersion in the fluidic substance 10 is checked by the system 100 based on the concentration of particles in the fluidic substance 10. By determining the particle concentration P1, necessary steps may be taken to diagnose and rectify a faulty instrument that may otherwise result in an erroneous analysis of a patient sample in an assay or analyzer. Further, the system 100 may be integrated in a clinical analyzer to diagnose the fluidic substance 10 (i.e., a reagent) while conducting routine testing of the patient samples. In this way, the clinical analyzer can conduct routine analyte testing as well as validate the reagent used in the routine testing. Further, validation of the reagent can be conducted in real-time concurrently with the tests. For evaluating the fluidic substance 10, the processor 20 of the system 100 uses the calibrated universal calibration curve 60 and the test grayscale value V2. By considering the universal calibration curve 56 and the calibrated universal calibration curve 60 during each test cycle, the system 100 may compensate for a variability in the system 100 that can otherwise be present due to the image capture device 200 and/or different containers 102. Therefore, the system 100, by considering the universal calibration curve 56 and the calibrated universal calibration curve 60 during each test cycle, may evaluate the fluidic substance 10 with improved precision and repeatability over a plurality of test cycles as compared to the conventional systems. Further, due to calibration of the universal calibration curve 56 based on the reference grayscale value V1 during each test cycle, the system 100 may provide results indicating the evaluation of the fluidic substance 10 with relatively less deviation.

Figure 14:
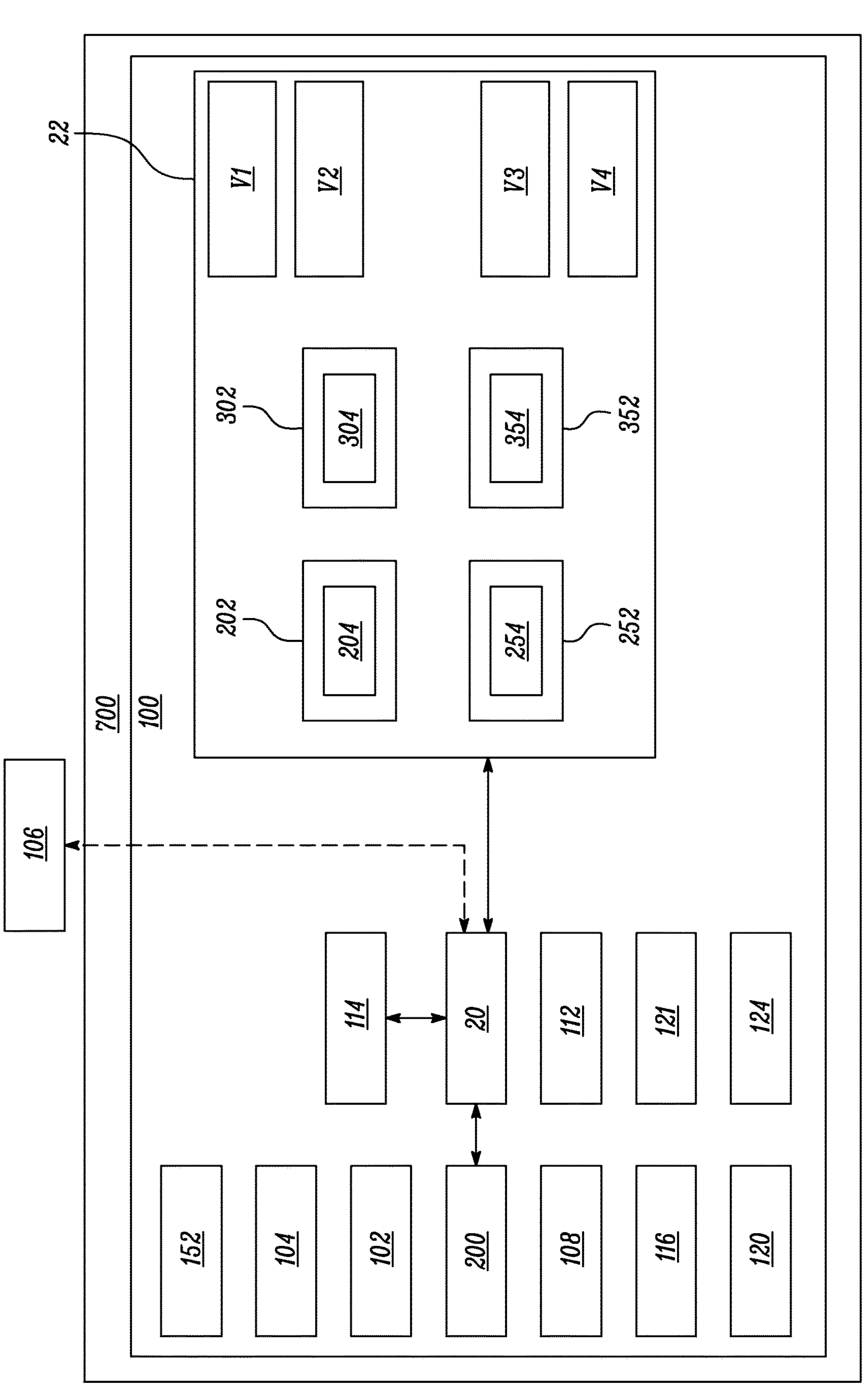
FIG. 14 is a block diagram of an automated analyzer comprising the system of FIG. 2, according to an embodiment of the present disclosure.
Figure 15:
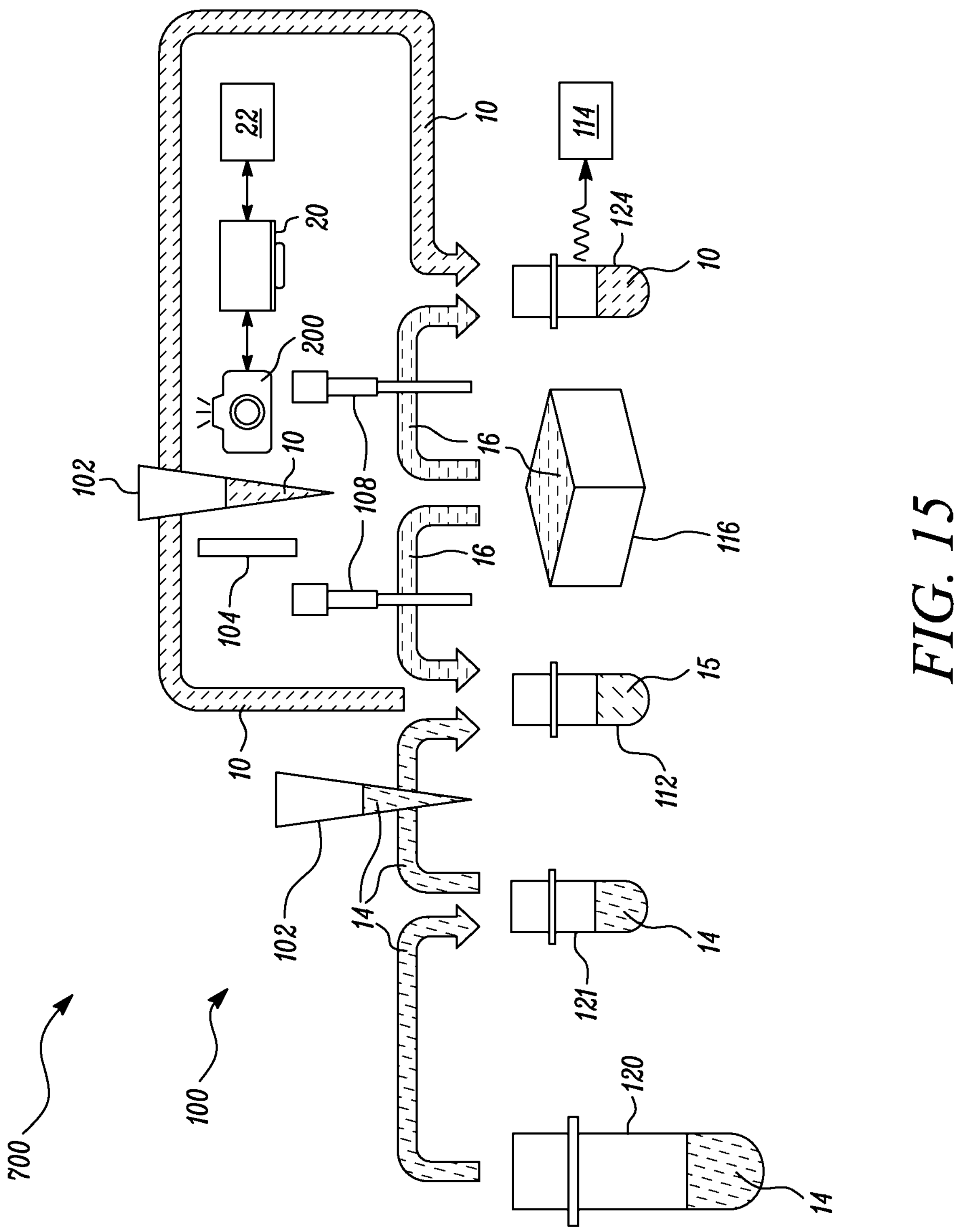
FIG. 15 is a schematic diagram of the automated analyzer of FIG. 14, according to an embodiment of the present disclosure.

FIG. 14 is a block diagram of an automated analyzer 700 comprising the system 100 of FIG. 2, according to an embodiment of the present disclosure. FIG. 15 is a schematic diagram of the automated analyzer 700. Further, the particles 11 of the reagent 16 are not shown in FIG. 15 for the purpose of clarity. The automated analyzer 700 may also include other components, such as feeder units, transfer units, sample racks, a wash wheel, etc. These components are not shown in FIGS. 14 and 15 for illustrative purposes. In some cases, the automated analyzer 700 may implement the method 600 of FIG. 1. Some components and operations of the automated analyzer 700 are not shown in FIGS. 14 and 15 for the purpose of clarity.

The automated analyzer 700 further includes a sample pack 120 configured to store a specimen sample 14. A given quantity of the specimen sample 14 is aliquoted into a sample vessel 121 from the sample pack 120. In the automated analyzer 700, the container 102 is configured to dispense the specimen sample 14 into the dilution vessel 112. The automated analyzer 700 further includes the reagent pipettor 108 configured to dispense the reagent 16 comprising the particles (e.g., the particles 11 shown in FIG. 3) into the dilution vessel 112. The reagent pipettor 108 is further configured to dispense the diluent 15 into the dilution vessel 112. The specimen sample 14, the reagent 16, and the diluent 15 are mixed in the dilution vessel 112 to form the fluidic substance 10 (interchangeably referred to as "the fluidic substance sample 10"). The reagent pipettor 108 is further configured to dispense the reagent 16 into a reaction vessel 124. In the illustrated embodiment of FIGS. 14 and 15, the sample pack 120, and the reaction vessel 124 are shown as parts of the system 100 of the automated analyzer 700.

In the automated analyzer 700, the container 102 is further configured to aspirate a diagnostic volume of the fluidic substance 10 from the dilution vessel 112 and dispense the diagnostic volume into the reaction vessel 124. The fluidic substance 10 dispensed by the container 102 and comprising the mixture of the specimen sample 14, the reagent 16, and the diluent 15 may further mix with the reagent 16 dispensed by the reagent pipettor 108 in the reaction vessel 124. Furthermore, the different constituents of the fluidic substance 10 may undergo a chemical reaction in the reaction vessel 124 and provide an optical output (e.g., chemiluminescence). The automated analyzer 700 further includes the luminometer 114 (also shown in FIG. 1) configured to perform an optical analysis of the fluidic substance 10 in the reaction vessel 124. The processor 20 is communicably coupled to the luminometer 114 and the image capture device 200. The processor 20 is configured to determine a test result value (shown in FIG. 16) of the fluidic substance 10 in the reaction vessel 124 based on the optical analysis performed by the luminometer 114.

In FIG. 15, the container 102 is shown as containing the specimen sample 14 and the fluidic substance sample 10 separately to illustrate the two different functions of the container 102. Similarly, the reagent pipettor 108 is shown as dispensing the reagent 16 to the dilution vessel 112 and the reaction vessel 124 to illustrate the two different functions of the reagent pipettor 108.

Figure 16:
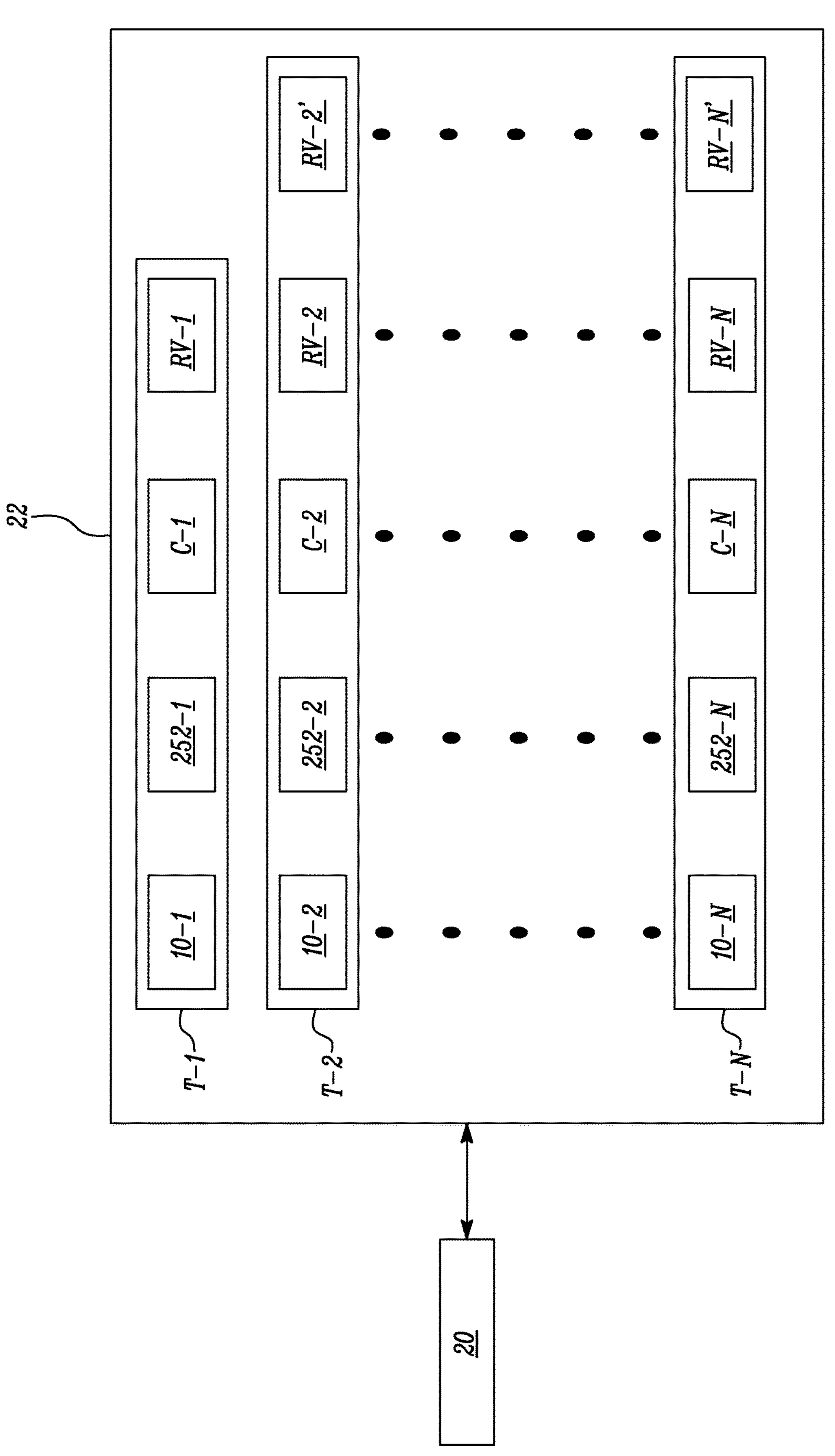
FIG. 16 is a block diagram illustrating a plurality of tests performed by the system of the automated analyzer of FIG. 15, according to an embodiment of the present disclosure.

FIG. 16 is a block diagram illustrating a plurality of tests T-1, T-2 . . . T-N performed by the system 100 of the automated analyzer 700 of FIG. 15, according to an embodiment of the present disclosure. Specifically, the system 100 is configured to perform the plurality of tests T-1, T-2 . . . T-N via testing a plurality of fluidic substance samples 10-1, 10-2 . . . 10-N. The fluidic substance samples 10-1, 10-2 . . . 10-N may be collectively referred to as "the fluidic substance samples 10" or "each of the plurality of fluidic substance samples 10".

During each test T-1, T-2 . . . T-N, the container 102 aspirates a volume of the specimen sample 14 from the sample vessel 121 and dispenses the aspirated volume of the specimen sample 14 into the dilution vessel 112. Further, during each test T-1, T-2 . . . T-N, the reagent pipettor 108 is configured to dispense the reagent 16 into the dilution vessel 112. During each test T-1, T-2 . . . T-N, the reagent pipettor 108 is also configured to dispense (not shown) the diluent 15 into the dilution vessel 112.

During the plurality of tests T-1, T-2 . . . T-N, the specimen sample 14, the diluent 15, and the reagent 16 are mixed in the dilution vessel 112 to form the corresponding fluidic substance samples 10-1, 10-2 . . . 10-N. Therefore, in the illustrated embodiment of FIG. 16, each fluidic substance sample 10-1, 10-2 . . . 10-N includes at least a mixture of the specimen sample 14, the diluent 15 and the reagent 16 comprising the particles (e.g., the particles 11 shown in FIG. 3). Thus, each of the fluidic substance samples 10-1, 10-2 . . . 10-N comprises the particles 11. During each test T-1, T-2 . . . T-N, the container 102 is configured to aspirate a volume of the corresponding fluidic substance sample 10-1, 10-2 . . . 10-N. For example, during the test T-1, the container 102 aspirates a volume of the fluidic substance sample 10-1. During the test T-2, the container 102 aspirates a volume of the fluidic substance sample 10-2. Therefore, the container 102 is configured to successively contain an aspirated volume of each of the plurality of fluidic substance samples 10-1, 10-2 . . . 10-N in each of the corresponding plurality of tests T-1, T-2 . . . T-N.

The image capture device 200 is configured to capture a plurality of test images 252-1, 252-2 . . . 252-N (shown in FIG. 16) of the container 102 containing the aspirated volumes of the corresponding plurality of fluidic substance samples 10-1, 10-2 . . . 10-N. Further, the processor 20 is configured to determine a plurality of sample particle concentrations C-1, C-2 . . . C-N in the corresponding fluidic substance samples 10-1, 10-2 . . . 10-N. Specifically, the processor 20 is configured to determine the plurality of sample particle concentrations C-1, C-2 . . . C-N in the corresponding plurality of fluidic substance samples 10-1, 10-2 . . . 10-N based at least on the corresponding plurality of test images 252-1, 252-2 . . . 252-N. In some cases, for each of the plurality of tests T-1, T-2 . . . T-N, the processor 20 may determine the corresponding sample particle concentration C-1, C-2 . . . C-N in the corresponding fluidic substance sample 10-1, 10-2 . . . 10-N based on the reference image 202 of the container 102 in the empty state and the corresponding test image 252-1, 252-2 . . . 252-N. In other words, the processor 20 determines the plurality of sample particle concentrations C-1, C-2 . . . C-N in the corresponding fluidic substance samples 10-1, 10-2 . . . 10-N based on the process 360 described with reference to FIG. 13.

The processor 20 is further configured to determine a plurality of test result values RV-1, RV-2 . . . RV-N of the plurality of fluidic substance samples 10-1, 10-2 . . . 10-N. The luminometer 114 is communicably coupled to the processor 20. The luminometer 114 is configured to generate signals indicative of the test result values RV-1, RV-2 . . . RV-N by optical analysis of the corresponding fluidic substance samples 10-1, 10-2 . . . 10-N. The luminometer 114 may include a light tight enclosure containing a photomultiplier tube (PMT) for reading a magnitude of chemiluminescence light from the reaction vessel 124 containing the fluidic substance samples 10-1, 10-2 . . . 10-N of the corresponding tests T-1, T-2 . . . T-N. Therefore, the luminometer 114 detects the luminance in the reaction vessel 124 in each of the tests T-1, T-2 . . . T-N. In some embodiments, the test result values RV-1, RV-2 . . . RV-N include relative light unit (RLU) values. An RLU value of a fluidic substance sample is an output response of that fluidic substance. For example, a larger RLU value indicates more light intensity due to chemiluminescence, which indicates a larger amount of an analyte in the specimen sample 14 as compared to a smaller RLU value. The processor 20 is further configured to record a first sample particle concentration C-1 corresponding to a first test T-1 from the plurality of tests T-1, T-2 . . . T-N as a baseline particle concentration. The baseline particle concentration can be interchangeably referred to herein as "the baseline particle concentration C-1". The baseline sample particle concentration C-1 may be stored in the memory 22 The processor 20 is further configured to compare the sample particle concentration C-2 . . . C-N of each of the subsequent tests T2 . . . T-N with the baseline particle concentration C-1. While the system 100 conducts a second test T-2 from the plurality of tests T-1, T-2 . . . T-N, there can be some amount of the diluent 15 left in the reagent pipettor 108 from the first test T-1. Thus, when the system 100 moves from one test to a next test from the plurality of tests T-1, T-2 . . . T-N, a sample particle concentration in the next test may be less (keeping the reagent 16 and the diluent 15 constant) due to a residual diluent 15 in the reagent pipettor 108 used during the previous test from the plurality of tests T-1, T-2 . . . T-N. In some embodiments, each of the corresponding comparisons of the sample particle concentrations C-2 . . . C-N of the subsequent tests T-2 . . . T-N with the baseline particle concentration C-1 is indicative of the residual diluent 15 present on the reagent pipettor 108 from one or more previous tests T-1, T-2 . . . T-N−1.

Figure 17:
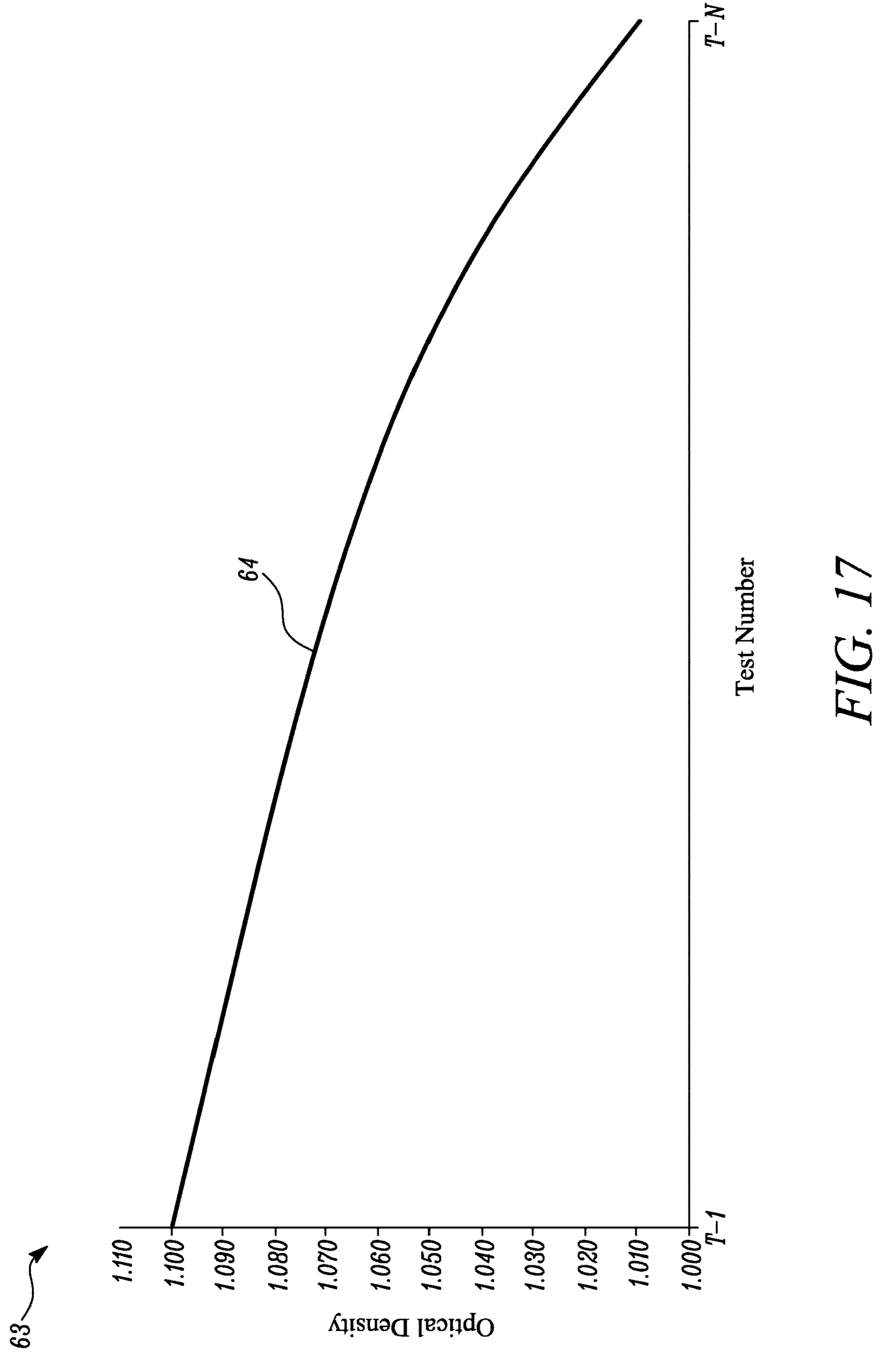
FIG. 17 is a graph illustrating a variation of optical density of test result values obtained from a plurality of fluidic substance samples with number of tests performed by the automated analyzer, according to an embodiment of the present disclosure.

FIG. 17 is a graph 63 illustrating a variation of optical density of the test result values RV-1, RV-2 . . . RV-N obtained from the plurality of fluidic substance samples 10-1, 10-2 . . . 10-N with the corresponding plurality of tests T-1, T-2 . . . T-N performed by the automated analyzer 700. The variation of the optical density of the test result values RV-1, RV-2 . . . RV-N obtained by testing the plurality of fluidic substance samples 10-1, 10-2 . . . 10-N is depicted by a density curve 64. Such variation of the optical density of the test result values RV-1, RV-2 . . . RV-N is due to the residual diluent 15 present on the reagent pipettor 108 from one or more previous tests T-1, T-2 . . . T-N−1. The variation or shift of the optical density of the test result values RV-1, RV-2 . . . RV-N may be an inherent part of the process when the system 100 conducts the plurality of tests T-1, T-2 . . . T-N and the diluent 15 is carried over to each of the subsequent tests T-2 . . . T-N. From the graph 63, it can be seen that the optical density of the test result values RV-1, RV-2 . . . RV-N obtained from the plurality of fluidic substance samples 10-1, 10-2 . . . 10-N gradually decreases as the system 100 moves from the first test T-1 to a test T-N. Further, the optical density of a test result value obtained from a fluidic substance sample corresponding to a given test from the plurality of tests T-2 . . . T-N is less than the optical density of a test result value obtained from a fluidic substance sample corresponding to one or more previous tests T-1, T-2 . . . T-N−1. In an example, this implies that the particle concentration in the fluidic substance sample 10-3 is less than the particle concentration in the fluidic substance sample 10-2. Similarly, the baseline particle concentration C-1 corresponding to the first test T-1 is the highest out of all of the particle concentrations C-1, C-2 . . . C-N in the plurality of fluidic substance samples 10-1, 10-2 . . . 10-N of the corresponding plurality of tests T-1, T-2 . . . T-N. While plotting the density curve 64, the amount of the reagent 16 and the diluent 15 is kept constant in the plurality of tests T-1, T-2 . . . T-N.

With reference to FIGS. 14, 15, and 16, the processor 20 is further configured to adjust the test result values RV-2 . . . RV-N corresponding to the subsequent tests T-2 . . . T-N based on the corresponding comparisons of the sample particle concentrations C-2 . . . C-N of the subsequent tests T-2 . . . T-N with the baseline particle concentration C-1. In some embodiments, the processor 20 is further configured to adjust the test result values RV-2 . . . RV-N corresponding to the subsequent tests T-2 . . . T-N based on corresponding deviations between the sample particle concentrations C-2 . . . C-N of the subsequent tests T-2 . . . T-N and the baseline particle concentration C-1. The processor 20 may obtain adjusted test result values RV-2' . . . RV-N' by adjusting the corresponding test result values RV-2 . . . RV-N.

Figure 18:
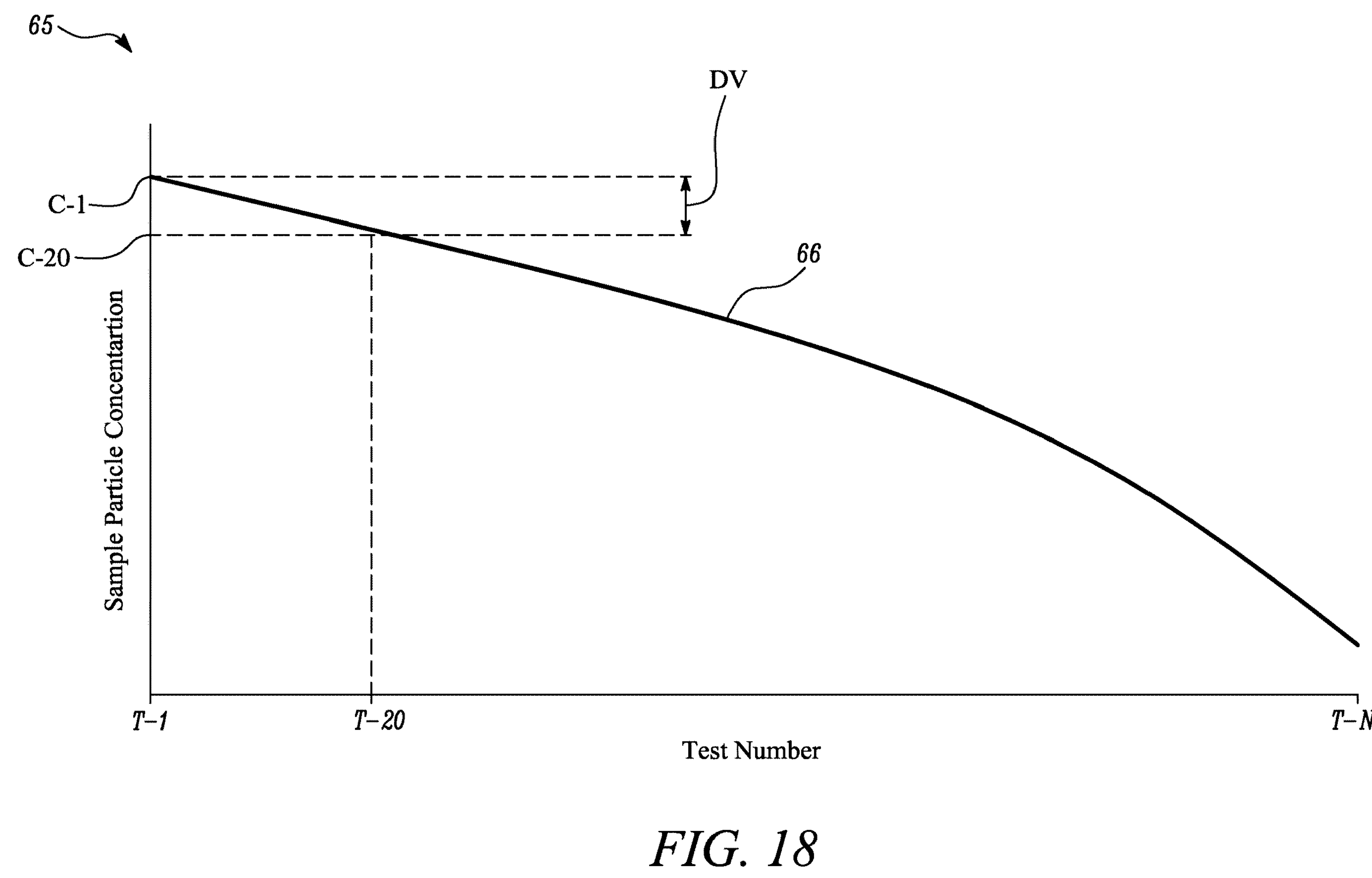
FIG. 18 is a graph illustrating a variation in sample particle concentrations in the fluidic substance samples of the corresponding plurality of tests of FIG. 16, according to an embodiment of the present disclosure.

FIG. 18 is a graph 65 illustrating a variation in the sample particle concentrations C-1, C-2 . . . C-N in the fluidic substance samples 10-1, 10-2 . . . 10-N of the corresponding plurality of tests T-1, T-2 . . . T-N, according to an embodiment of the present disclosure. The variation in the sample particle concentrations C-1, C-2 . . . C-N in the fluidic substance samples 10-1, 10-2 . . . 10-N of the corresponding plurality of tests T-1, T-2 . . . T-N is depicted by a concentration curve 66. Such variation in the sample particle concentrations C-1, C-2 . . . C-N in the fluidic substance samples 10-1, 10-2 . . . 10-N of the corresponding plurality of tests T-1, T-2 . . . T-N is due to the residual diluent 15 present on the reagent pipettor 108 from the one or more previous tests T-1, T-2 . . . T-N−1. Based on the process 360 (shown in FIG. 13), the concentration curve 66 can be generated by determining the plurality of sample particle concentrations C-1, C-2 . . . C-N in the fluidic substance samples 10-1, 10-2 . . . 10-N of the corresponding plurality of tests T-1, T-2 . . . T-N.

As shown in the graph 65, a deviation between the sample particle concentration C-20 of the test T-20 and the baseline particle concentration C-1 of the test T-1 can be indicated by a deviation DV. Based on the deviation DV, the processor 20 is configured to adjust the test result value RV-20 corresponding to the test T-20 to obtain the adjusted test result value RV-20'. Similarly, based on the corresponding deviations between the sample particle concentrations C-2 . . . C-N of the subsequent tests T-2 . . . T-N and the baseline particle concentration C-1, the processor 20 is configured to adjust the test result values RV-2 . . . RV-N corresponding to the subsequent tests T-2 . . . T-N to obtain the corresponding adjusted test result values RV-2' . . . RV-N'. Adjustment of the test result values RV-2 . . . RV-N corresponding to the subsequent tests T-2 . . . T-N based on the corresponding deviations (shown in FIG. 18) between the sample particle concentrations C-2 . . . C-N of the subsequent tests T-2 . . . T-N and the baseline particle concentration C-1 may compensate for dilution effect due to the residual diluent 15 carried over from previous tests T1, T2 . . . TN−1. Therefore, adjustment of the RLU values of the subsequent tests T-2 . . . T-N may enable the automated analyzer 700 to generate improved test result values that take into account the dilution effect caused by wash buffer carryover.

In an example where the test result values RV-1, RV-2 . . . RV-N include the RLU values, the RLU value of a fluidic substance sample from the plurality of fluidic substance samples 10-1, 10-2 . . . 10-N can be adjusted according to Equation 1 provided below:

$$\mathrm{RLU}(i)=\mathrm{RLU}(1)*C\text{-}1/C\text{-}i \quad \text{Equation 1}$$

where, RLU (i) is the RLU value of the $i^{th}$ fluidic substance sample from the plurality of fluidic substance samples 10-2 . . . 10-N (i.e., i can be any integer from 2 to N);

RLU (1) is the RLU value of the fluidic substance sample 10-1;

C-1 is the first sample particle concentration or the baseline particle concentration; and C-i is the sample particle concentration in the $i^{th}$ fluidic substance sample.

With reference to Equation 1, the RLU value of a given fluidic substance sample can be determined by using the RLU value of the fluidic substance sample 10-1 corresponding to the first test T-1, the baseline particle concentration C-1, and the sample particle concentration in the given fluidic substance sample.

In some embodiments, the system 100 is a part of a diagnostic analyzer. In other words, the diagnostic analyzer includes the system 100. In some embodiments, the automated analyzer 700 is a diagnostic analyzer. The diagnostic analyzer including the system 100 may be used for analyzing a sample for diagnostic purposes. In some embodiments, the system 100 is a part of an immunoassay analyzer. In other words, the immunoassay analyzer includes the system 100. In some embodiments, the automated analyzer 700 is an immunoassay analyzer. The immunoassay analyzer including the system 100 may be used for detecting a presence or concentration of analytes in a sample.

The automated analyzer 700 including the system 100 can determine the test result value of the fluidic substance 10 as well as determine the quality of the fluidic substance 10. In other words, the automated analyzer 700 can perform routine testing or analysis of the specimen sample 14 in the fluidic substance 10 as well as validate the fluidic substance 10 comprising the particles 11. In this manner, whenever the automated analyzer 700 outputs an inappropriate quality of the fluidic substance 10, routine testing of the specimen sample 14 can be stopped and checked. Further, an evaluation result or a test result value of the fluidic substance 10 may also be adjusted that could have been otherwise erroneous due to the compromised quality of the fluidic substance 10. The automated analyzer 700 including the system 100 can also adjust test result values to compensate for dilution effect due to wash buffer carryover from previous tests, thereby providing improved test result values with less error.

Figure 19:
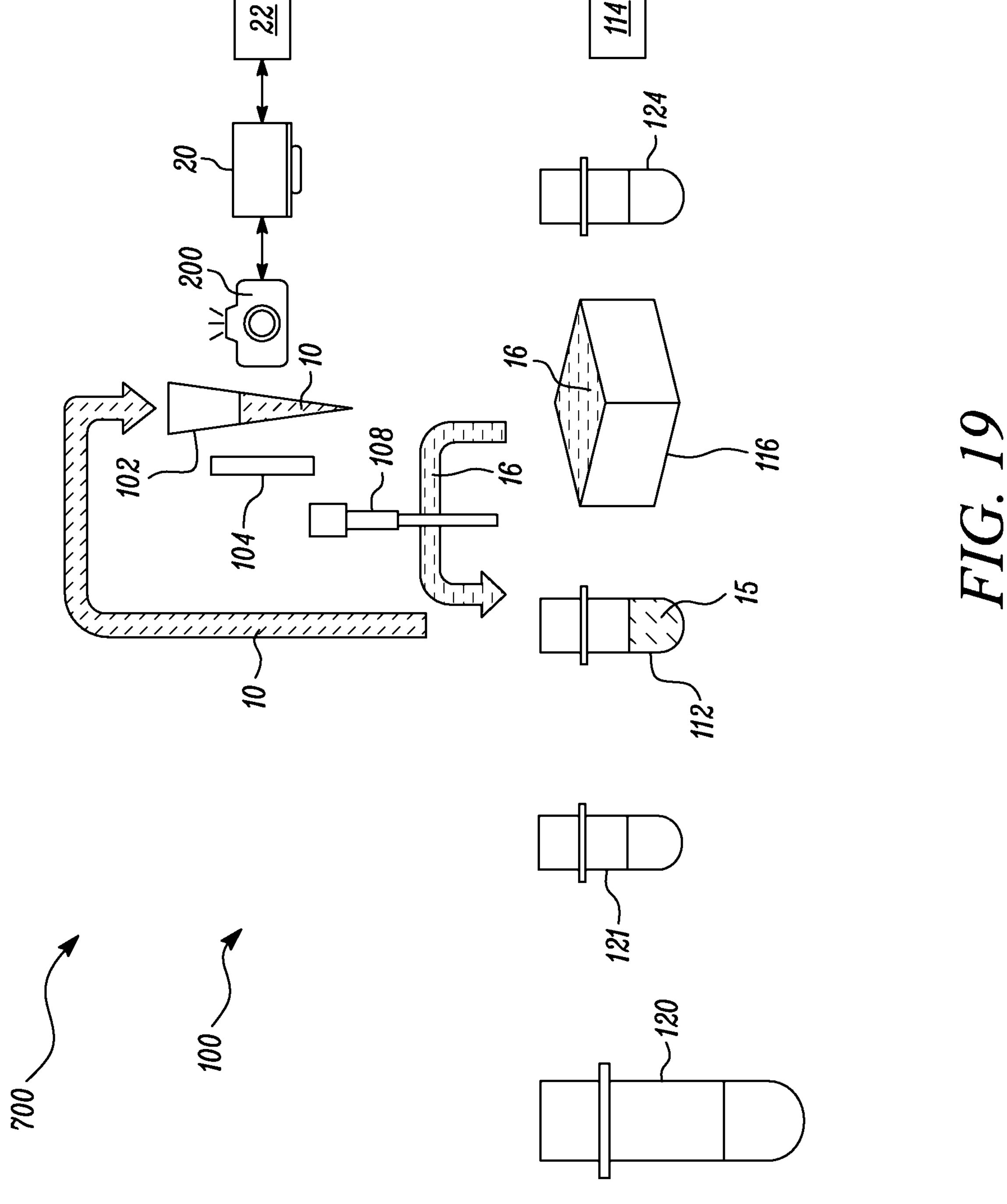
FIG. 19 is a schematic diagram of the automated analyzer, according to another embodiment of the present disclosure.

FIG. 19 is a schematic diagram of the automated analyzer 700, according to another embodiment of the present disclosure. According to this embodiment, the fluidic substance 10 is a mixture of the diluent 15 and the reagent 16 comprising the particles (e.g., the particles 11 shown in FIG. 3). Thus, in the illustrated embodiment of FIG. 19, no specimen sample 14 is aspirated from the sample vessel 121 and dispensed into the dilution vessel 112. Therefore, the fluidic substance 10 is not dispensed into the reaction vessel 124 for optical analysis via the luminometer 114. As stated above, the container 102 is configured to aspirate the diagnostic volume of the fluidic substance 10 comprising the mixture of at least the diluent 15 and the reagent 16. In the illustrated embodiment of FIG. 19, the fluidic substance 10 is tested for validation and for justifying the dilution rate in the fluidic substance 10.

With reference to FIGS. 6A, 6B, 14, and 19, the image capture device 200 is configured to capture the reference image 202 of at least a portion (i.e., the body portion 166) of the container 102 in the empty state and the test image 252 of the container 102 containing the diagnostic volume of the fluidic substance 10. The processor 20 is further configured to determine the reference grayscale value V1 of at least a portion of the reference image 202. In some embodiments, at least the portion of the reference image 202 is the one or more empty regions of interest 204 (shown in FIG. 6A). The processor 20 is further configured to determine the test grayscale value V2 of at least a portion of the test image 252. In some embodiments, at least the portion of the test image 252 is the one or more test regions of interest 254 (shown in FIG. 6B).

The processor 20 is further configured to calibrate the universal calibration curve 56 (shown in FIG. 10) relating the particle concentration and the grayscale value based on the reference and test grayscale value V1, V2. The processor 20 is further configured to determine the particle concentration P1 (shown in FIG. 10) in the fluidic substance 10 based on the test grayscale value V2 and the calibrated universal calibration curve 60 (shown in FIG. 12). The processor 20 is further configured to determine the quality of the fluidic substance 10 based on the particle concentration P1 in the fluidic substance 10. In some embodiments, the quality of the fluidic substance 10 is indicative of the dispersion of the particles in the fluidic substance 10.

The automated analyzer 700 including the system 100 may determine a dilution rate or estimate the dilution performance by determining the particle concentration P1 (shown in FIG. 10) in the fluidic substance 10. A skilled technician may choose a desirable dilution rate in the fluidic substance 10 based on the particle concentration P1 in the fluidic substance 10, so that during testing, a specimen sample (e.g., the specimen sample 14 shown in FIG. 15) in the fluidic substance 10 can be properly tested and analyzed.

In some embodiments, with reference to FIGS. 14, 15, and 19, the processor 20 is configured to generate a flagging result based on the particle concentration P1 (shown in FIG. 10) in the fluidic substance 10. The flagging result is indicative of the quality of the fluidic substance 10.

In an example, the flagging result may indicate that the particles in the diagnostic volume of the fluidic substance 10 are not properly dispersed. In another example, the flagging result may indicate that the particles 11 in the diagnostic volume of the fluidic substance 10 are properly dispersed. In some embodiments, in the automated analyzer 700, the flagging result comprises a pass or a fail.

In some embodiments, in the automated analyzer 700, the flagging result includes an error flag when the magnitude of the difference between the expected particle concentration and the particle concentration P1 based on the test grayscale value V2 and the calibrated universal calibration curve 60 is greater than 20% of the expected particle concentration.

In some embodiments, in the automated analyzer 700, the flagging result includes an error flag when the magnitude of the difference between the expected particle concentration and the particle concentration P1 based on the test grayscale value V2 and the calibrated universal calibration curve 60 is greater than 10% of the expected particle concentration.

In some embodiments, in the automated analyzer 700, the flagging result includes an error flag when the magnitude of the difference between the particle concentration P1 and 0.01 mg/ml is greater than 10% of 0.01 mg/ml.

In some embodiments, in the automated analyzer 700, the flagging result includes an error flag when the particle concentration P1 is greater than 0.0115 mg/ml. In some embodiments, in the automated analyzer 700, the flagging result includes an error flag when the particle concentration P1 is less than 0.0085 mg/ml.

Figure 20:
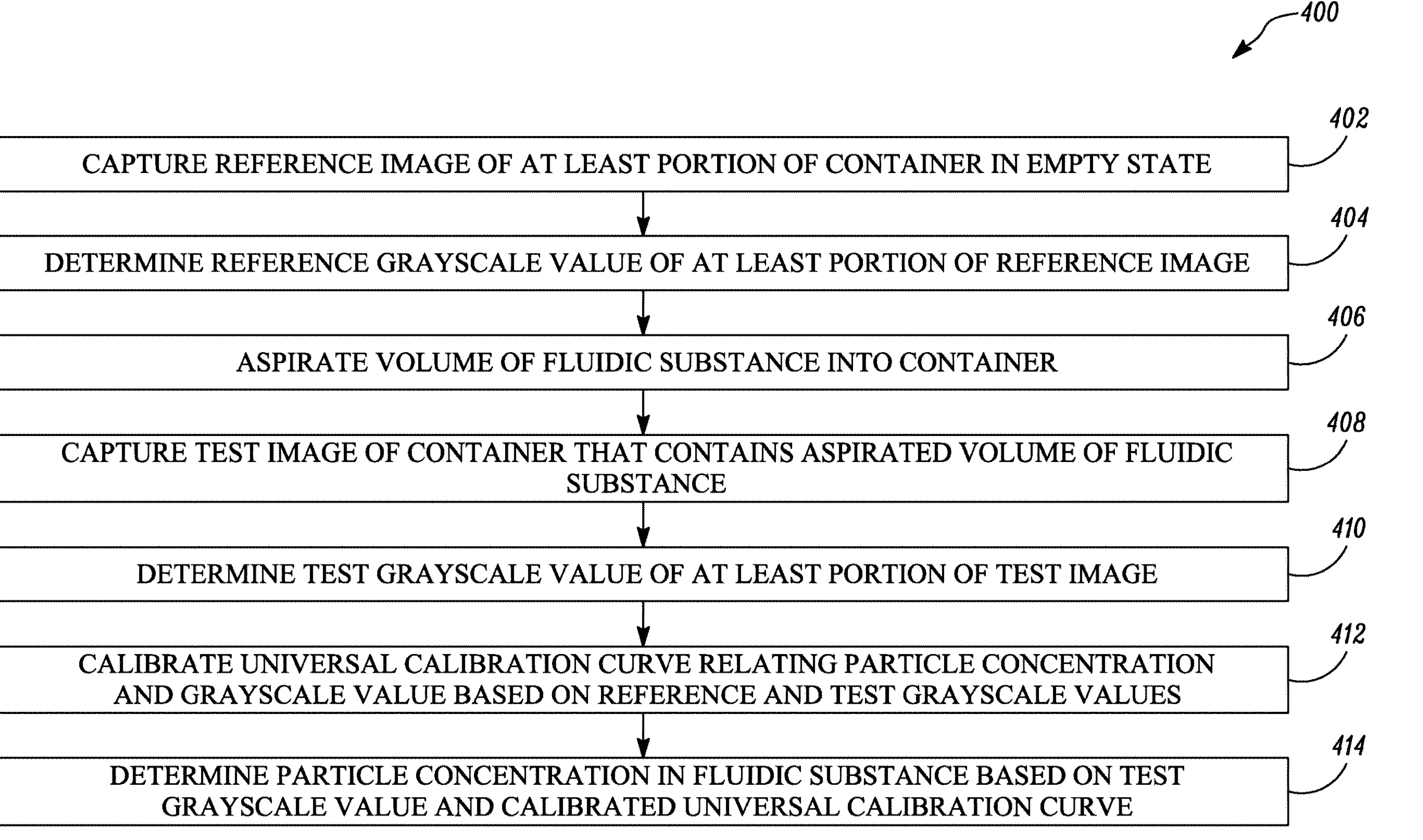
FIG. 20 is a flowchart illustrating a method of evaluating the fluidic substance, according to an embodiment of the present disclosure.

FIG. 20 illustrates a flowchart for a method 400 of evaluating the fluidic substance 10 having particles (e.g., the particles 11 shown in FIG. 3), according to an embodiment of the present disclosure. The method 400 includes operations 402, 404, 406, 408, 410, 412, and 414.

With reference to FIGS. 2, 6A and 20, at operation 402, the image capture device 200 captures the reference image 202 of at least a portion of the container 102 that is in an empty state. In some embodiments, at least the portion of the container 102 is the body portion 166 of the container 102. Further, the processor 20 determines the one or more empty regions of interest 204 in the reference image 202 of the container 102. The method 400 further includes providing the screen 104 spaced apart from the image capture device 200, such that the container 102 is positioned between the image capture device 200 and the screen 104.

At operation 404, the processor 20 determines the reference grayscale value V1 of at least a portion of the reference image 202. In some embodiments, at least the portion of the reference image 202 is the one or more empty regions of interest 204. In some embodiments, the reference grayscale value V1 is an average grayscale value of the one or more empty regions of interest 204.

With reference to FIGS. 3 and 20, at operation 406, the container 102 aspirates a volume of the fluidic substance 10 having the particles (e.g., the particles 11 shown in FIG. 3). In some embodiments, the particles in the fluidic substance 10 are paramagnetic particles or magnetic particles. With reference to FIGS. 2, 6B, and 20, at operation 408, the image capture device 200 captures the test image 252 of the container 102 containing the aspirated volume of the fluidic substance 10. Further, the processor 20 determines the one or more test regions of interest 254 in the test image 252 of the container 102.

At operation 410, the processor 20 determines the test grayscale value V2 of at least a portion of the test image 252. In some embodiments, at least the portion of the test image 252 is the one or more test regions of interest 254. In some embodiments, the test grayscale value V2 is an average grayscale value of the one or more test regions of interest 254.

In some embodiments, the method 400 further includes conducting the plurality of trials to generate the universal calibration curve 56 (shown in FIG. 10). With reference to FIGS. 2, 7, 8A, 8B and 20, for conducting each trial, the image capture device 200 captures the baseline image 302 of at least a portion of the trial container 152 that is in an empty state. For conducting each trial, the processor 20 determines the baseline grayscale value V3 of at least a portion of the baseline image 302. For conducting each trial, the trial container 152 aspirates a volume of the trial fluidic substance 12 comprising the particles. Conducting each trial further includes forming the trial fluidic substance 12 via mixing the diluent 15 with the reagent 16 comprising the particles For conducting each trial, the image capture device 200 captures the trial image 352 of the trial container 152 containing the aspirated volume of the trial fluidic substance 12. For conducting each trial, the processor 20 determines the trial grayscale value V4 of at least a portion of the trial image 352 by using the baseline grayscale value V3 as a reference. With reference to FIGS. 2, 9, and 10, for conducting each trial, the spectrophotometer 106 determines the trial particle concentration P2 in the trial fluidic substance 12. For conducting each trial, the processor 20 records the trial particle concentration P2 corresponding to the trial grayscale value V4. The processor 20 generates the plot 52 (shown in FIG. 9) between the trial grayscale values V4 and the trial particle concentrations P2 corresponding to the plurality of trials. The universal calibration curve 56 (shown in FIG. 10) is generated from the plot 52.

With reference to FIGS. 2, 11, 12, and 20, at operation 412, the processor 20 calibrates the universal calibration curve 56 relating the particle concentration and the grayscale value based on the reference and test grayscale values V1, V2. In some embodiments, for calibrating the universal calibration curve 56, the processor 20 utilizes the reference grayscale value V1 and the test grayscale value V2 to adjust the output of the universal calibration curve 56. The processor 20 calibrates the universal calibration curve 56 to generate the calibrated universal calibration curve 60.

At operation 414, the processor 20 determines the particle concentration P1 in the fluidic substance 10 based on the test grayscale value V2 and the calibrated universal calibration curve 60. In some embodiments, for determining the particle concentration P1, the processor 20 converts the test grayscale value V2 to the particle concentration P1 by applying the calibrated universal calibration curve 60.

In some embodiments, the method 400 further includes generating a flagging result based on the particle concentration P1 in the fluidic substance 10. The flagging result is indicative of the quality of the fluidic substance 10. In some embodiments, the flagging result comprises a pass or a fail.

With reference to FIGS. 2, 12, and 20, in some embodiments, the flagging result includes an error flag when the magnitude of the difference between the expected particle concentration and the particle concentration P1 based on the test grayscale value V2 and the calibrated universal calibration curve 60 is greater than 20% of the expected particle concentration.

With reference to FIGS. 2, 12, and 20, in some embodiments, the flagging result includes an error flag when the magnitude of the difference between the expected particle concentration and the particle concentration P1 based on the test grayscale value V2 and the calibrated universal calibration curve 60 is greater than 20% of the expected particle concentration. With reference to FIGS. 2, 12, and 20, in some embodiments, the flagging result includes an error flag when the magnitude of the difference between the particle concentration P1 and 0.01 mg/ml is greater than 10% of 0.01 mg/ml.

With reference to FIGS. 2, 12, and 20, in some embodiments, the flagging result includes an error flag when the particle concentration P1 is greater than 0.0115 mg/ml. With reference to FIGS. 2, 12, and 20, in some embodiments, the flagging result includes an error flag when the particle concentration P1 is less than 0.0085 mg/ml.

In some embodiments, the method 400 is implemented in a diagnostic analyzer. In some embodiments, the method 400 is implemented in an immunoassay analyzer. In some embodiments, the method 400 is implemented in the automated analyzer 700 illustrated in FIG. 14. FIG. 21 is a flowchart illustrating a method 500 of performing the plurality of tests T-1, T-2 . . . T-N (shown in FIG. 16) via testing the plurality of fluidic substance samples 10-1, 10-2 . . . 10-N, according to an embodiment of the present disclosure. The container 102 is used to successively contain an aspirated volume of each of plurality of fluidic substance samples 10-1, 10-2 . . . 10-N for conducting the corresponding test T-1, T-2 . . . T-N. The method 500 includes operations 502, 504, 506, 508, and 510.

With reference to FIGS. 14, 15, 16, and 20, at operation 502, the method 500 includes determining the plurality of sample particle concentrations C-1, C-2 . . . C-N in the corresponding fluidic substance samples 10-1, 10-2 . . . 10-N. The image capture device 200 captures the plurality of test images 252-1, 252-2 . . . 252-N of the container 102 containing the aspirated volumes of the corresponding plurality of fluidic substance samples 10-1, 10-2 . . . 10-N. The processor 20 determines the plurality of sample particle concentrations C-1, C-2 . . . C-N in the corresponding plurality of fluidic substance samples 10-1, 10-2 . . . 10-N based at least on the corresponding plurality of test images 252-1, 252-2 . . . 252-N.

In some cases, for each of the plurality of tests T-1, T-2 . . . T-N, the processor 20 may determine the corresponding sample particle concentration C-1, C-2 . . . C-N in the corresponding fluidic substance sample 10-1, 10-2 . . . 10-N based on the reference image 202 of the container 102 in the empty state and the corresponding test image 252-1, 252-2 . . . 252-N. In some cases, at the operation 502, the method 400 (shown in FIG. 20) may be used to determine each of the plurality of sample particle concentrations C-1, C-2 . . . C-N in the corresponding fluidic substance samples 10-1, 10-2 . . . 10-N.

In some embodiments, each fluidic substance sample 10-1, 10-2 . . . 10-N includes at least a mixture of the specimen sample 14, the diluent 15, and the reagent 16 comprising the particles (e.g., the particles 11 shown in FIG. 3).

Further, while conducting each test T-1, T-2 . . . T-N, the container 102 dispenses the specimen sample 14 into the dilution vessel 112. While conducting each test T-1, T-2 . . . T-N, the reagent pipettor 108 dispenses the reagent 16 into the dilution vessel 112. While conducting each test T-1, T-2 . . . T-N, the reagent pipettor 108 dispenses the diluent 15 into the dilution vessel 112. While conducting each test T-1, T-2 . . . T-N, the specimen sample 14, the diluent 15, and the reagent 16 are mixed in the dilution vessel 112 to form the fluidic substance 10. The volume of the fluidic substance 10 in the container 102 is aspirated from the dilution vessel 112. At operation 504, the method 500 includes determining the plurality of test result values RV-1, RV-2 . . . RV-N of the plurality of fluidic substance samples 10-1, 10-2 . . . 10-N. In some embodiments, the test result values RV-1, RV-2 . . . RV-N include the RLU values. In some embodiments, the luminometer 114 optically analyzes corresponding fluidic substance samples 10-1, 10-2 . . . 10-N to determine the plurality of test result values RV-1, RV-2 . . . RV-N. At operation 506, the method 500 includes recording the first sample particle concentration C-1 corresponding to the first test T-1 from the plurality of tests T-1, T-2 . . . T-N as the baseline particle concentration C-1.

At operation 508, the method 500 includes comparing the sample particle concentration C-2 . . . C-N of each of the subsequent tests T2 . . . T-N with the baseline particle concentration C-1. In some embodiments, each of the corresponding comparisons of the sample particle concentrations C-2 . . . C-N of the subsequent tests T-2 . . . T-N with the baseline particle concentration C-1 is indicative of the residual diluent 15 present on the reagent pipettor 108 from one or more previous tests T-1, T-2 . . . T-N−1.

At operation 510, the method 500 includes adjusting the test result values RV-2 . . . RV-N corresponding to the subsequent tests T-2 . . . T-N based on the corresponding comparisons of the sample particle concentrations C-2 . . . C-N of the subsequent tests T-2 . . . T-N with the baseline particle concentration C-1. In some embodiments, the test result values RV-2 . . . RV-N corresponding to the subsequent tests T-2 . . . T-N are adjusted based on corresponding deviations between the sample particle concentrations C-2 . . . C-N of the subsequent tests T-2 . . . T-N and the baseline particle concentration C-1.

Figure 22:
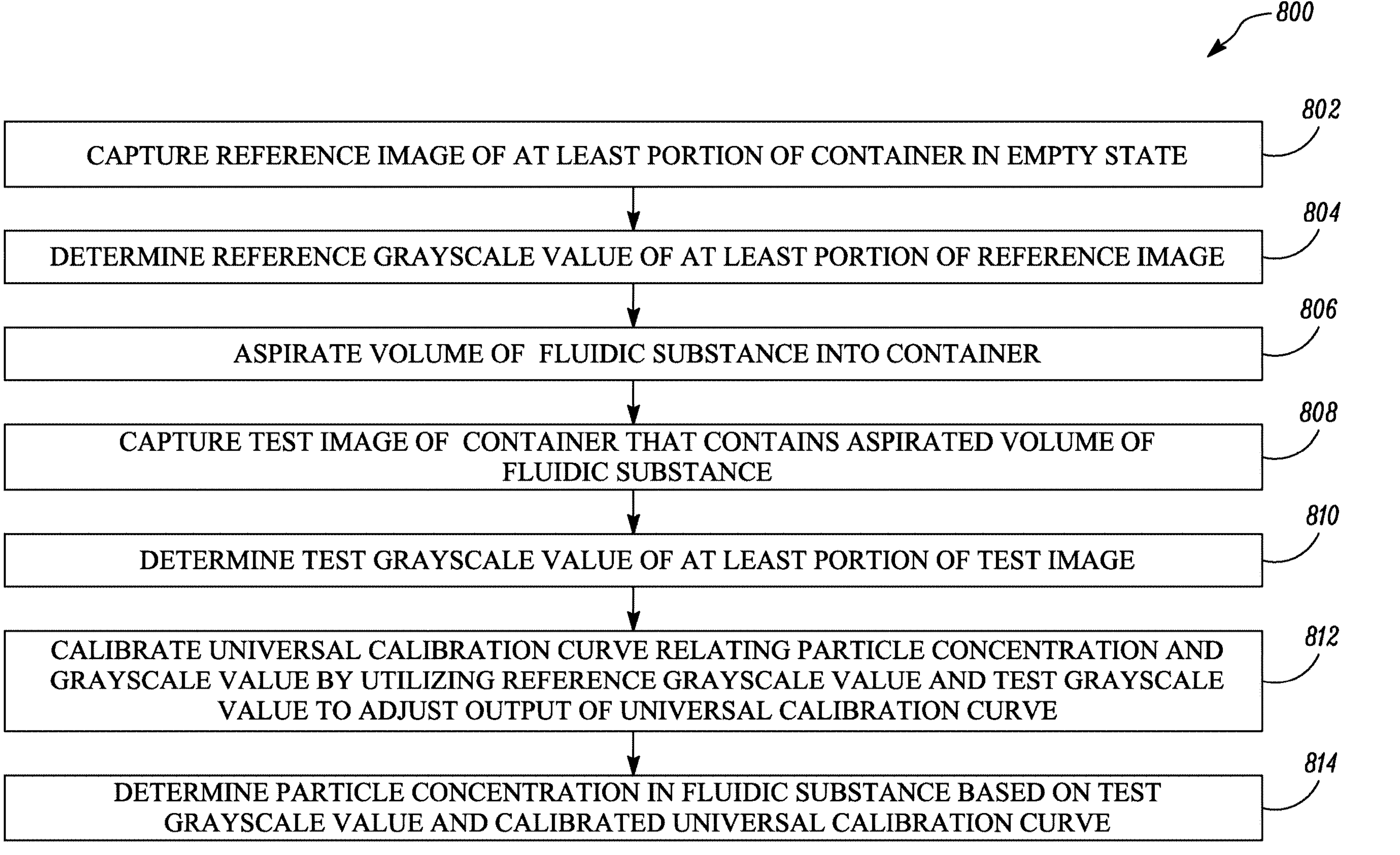
FIG. 22 is a flowchart illustrating a method of evaluating the fluidic substance, according to another embodiment of the present disclosure.

In some embodiments, the method 500 is implemented in a diagnostic analyzer. In some embodiments, the method 500 is implemented in an immunoassay analyzer. In some embodiments, the method 500 is implemented in the automated analyzer 700 illustrated in FIG. 14. FIG. 22 is a flowchart illustrating a method 800 of evaluating the fluidic substance 10 having the particles (e.g., the particles 11 shown in FIG. 3) according to an embodiment of the present disclosure. The method 800 includes operations 802, 804, 806, 808, 810, 812, and 814.

With reference to FIGS. 2, 6A and 22, at operation 802, the image capture device 200 captures the reference image 202 of at least a portion of the container 102 that is in an empty state.

At operation 804, the processor 20 determines the reference grayscale value V1 of at least a portion of the reference image 202. At operation 806, the container 102 aspirates a volume of the fluidic substance 10 having the particles.

With reference to FIGS. 2, 6B and 22, at operation 808, the image capture device 200 captures the test image 252 of the container 102 containing the aspirated volume of the fluidic substance 10. At operation 810, the processor 20 determines the test grayscale value V2 of at least a portion of the test image 252.

With reference to FIGS. 2, 11, 12, and 22, at operation 812, the processor 20 calibrates the universal calibration curve 56 relating the particle concentration and the grayscale value by utilizing the reference grayscale value V1 and the test grayscale value V2 to adjust the output of the universal calibration curve 56.

At operation 814, the processor 20 determines the particle concentration P1 in the fluidic substance 10 based on the test grayscale value V2 and the calibrated universal calibration curve 60.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of evaluating a fluidic substance having particles, the method comprising:

capturing, via an image capture device, a reference image of at least a portion of a container that is in an empty state;

determining, via a processor, a reference grayscale value of at least a portion of the reference image;

aspirating an aspirated volume of the fluidic substance into the container;

capturing, via the image capture device, a test image of the container containing the aspirated volume of the fluidic substance;

determining, via the processor, a test grayscale value of at least a portion of the test image;

calibrating, via the processor, a universal calibration curve relating particle concentration and grayscale value based on the reference grayscale value and the test grayscale value to generate a calibrated universal calibration curve;

determining, via the processor, a particle concentration in the fluidic substance based on the test grayscale value and the calibrated universal calibration curve; and generating a flagging result based on the particle concentration in the fluidic substance, wherein the flagging result is indicative of a quality of the fluidic substance, and wherein the flagging result comprises (i) a pass or a fail, or (ii) an error flag when a magnitude of a difference between an expected particle concentration and the particle concentration based on the test grayscale value and the calibrated universal calibration curve is greater than 20% of the expected particle concentration, or (iii) an error flag when a magnitude of a difference between the particle concentration and 0.01 mg/ml is greater than 10% of 0.01 mg/ml, or (iv) an error flag when the particle concentration is greater than 0.0115 mg/ml, or (v) an error flag when the particle concentration is less than 0.0085 mg/ml.

2. The method of claim 1, further comprising determining, via the processor, one or more empty regions of interest in the reference image of the container, wherein the reference grayscale value is an average grayscale value of the one or more empty regions of interest.

3. The method of claim 1, wherein calibrating the universal calibration curve further comprises utilizing the reference grayscale value and the test grayscale value to adjust an output of the universal calibration curve.

4. The method of claim 1, further comprising determining, via the processor, one or more test regions of interest in the test image of the container, wherein the test grayscale value is an average grayscale value of the one or more test regions of interest.

5. The method of claim 1, wherein determining the particle concentration further comprises converting the test grayscale value to the particle concentration by applying the calibrated universal calibration curve.

6. The method of claim 1, further comprising conducting a plurality of trials to generate the universal calibration curve, wherein conducting each trial comprises, for each trial of the plurality of trials:

capturing, via the image capture device, a baseline image of at least a portion of a trial container that is in an empty state;

determining, via the processor, a baseline grayscale value of at least a portion of the baseline image;

aspirating an aspirated volume of a trial fluidic substance comprising the particles into the trial container;

capturing, via the image capture device, a trial image of the trial container containing the aspirated volume of the trial fluidic substance;

determining, via the processor, a trial grayscale value of at least a portion of the trial image by using the baseline grayscale value as a reference;

determining, via a spectrophotometer, a trial particle concentration in the trial fluidic substance; and recording, via the processor, the trial particle concentration corresponding to the trial grayscale value.

7. The method of claim 6, further comprising generating a plot between the trial grayscale values corresponding to the plurality of trials and the trial particle concentrations corresponding to the plurality of trials, wherein the universal calibration curve is generated from the plot.

8. A system for evaluating a fluidic substance having particles, the system comprising:

a container configured to contain an aspirated volume of the fluidic substance;

an image capture device configured to capture a reference image of at least a portion of the container in an empty state and a test image of the container containing the aspirated volume of the fluidic substance; and a processor communicably coupled to the image capture device, wherein the processor is configured to:

determine a reference grayscale value of at least a portion of the reference image;

determine a test grayscale value of at least a portion of the test image;

calibrate a universal calibration curve relating particle concentration and grayscale value based on the reference grayscale value and the test grayscale value to generate a calibrated universal calibration curve;

determine a particle concentration in the fluidic substance based on the test grayscale value and the calibrated universal calibration curve; and generate a flagging result based on the particle concentration in the fluidic substance, wherein the flagging result is indicative of a quality of the fluidic substance, and wherein the flagging result comprises (i) a pass or a fail, or (ii) an error flag when a magnitude of a difference between an expected particle concentration and the particle concentration based on the test grayscale value and the calibrated universal calibration curve is greater than 20% of the expected particle concentration, or (iii) an error flag when a magnitude of a difference between the particle concentration and 0.01 mg/ml is greater than 10% of 0.01 mg/ml, or (iv) an error flag when the particle concentration is greater than 0.0115 mg/ml, or (v) an error flag when the particle concentration is less than 0.0085 mg/ml.

9. The system of claim 8, wherein the processor is further configured to determine one or more empty regions of interest in the reference image of the container, and wherein the processor is further configured to determine the reference grayscale value as an average grayscale value of the one or more empty regions of interest.

10. The system of claim 8, wherein the processor is further configured to calibrate the universal calibration curve by utilizing the reference grayscale value and the test grayscale value to adjust an output of the universal calibration curve.

11. The system of claim 8, wherein the processor is further configured to determine one or more test regions of interest in the test image of the container, and wherein the processor is further configured to determine the test grayscale value as an average grayscale value of the one or more test regions of interest.

12. The system of claim 8, wherein the processor is further configured to convert the test grayscale value to the particle concentration by applying the calibrated universal calibration curve in order to determine the particle concentration.

13. The system of claim 8, wherein the system is further configured to conduct a plurality of trials to generate the universal calibration curve, and wherein, for each trial:

the system further comprises a trial container configured to contain an aspirated volume of a trial fluidic substance comprising the particles;

the image capture device is further configured to capture a baseline image of at least a portion of the trial container in an empty state and a trial image of the trial container containing the aspirated volume of the trial fluidic substance; and the processor is further configured to:

determine a baseline grayscale value of at least a portion of the baseline image; and determine a trial grayscale value of at least a portion of the trial image by using the baseline grayscale value as a reference.

14. The system of claim 13, wherein the processor is further configured to:

for each trial, determine a trial particle concentration in the trial fluidic substance based on signals received from a spectrophotometer;

record the trial particle concentrations corresponding to the plurality of trials;

generate a plot between the trial grayscale values corresponding to the plurality of trials and the trial particle concentrations corresponding to the plurality of trials; and generate the universal calibration curve from the plot.

* * * * *